(12) United States Patent
Shaw et al.

(10) Patent No.: US 10,848,823 B2
(45) Date of Patent: Nov. 24, 2020

(54) DELIVERING AUXILIARY CONTENT AND DETERMINING PROPER ENGAGEMENT RESPONSE

(71) Applicant: PIKSEL, INC., Wilmington, DE (US)

(72) Inventors: Philip Antony Shaw, London (GB); Hans-Jurgen Maas, Mainz (DE)

(73) Assignee: PIKSEL, INC., Wilmington, DE (US)

( * ) Notice: Subject to any disclaimer, the term of this patent is extended or adjusted under 35 U.S.C. 154(b) by 122 days.

(21) Appl. No.: 16/126,933

(22) Filed: Sep. 10, 2018

(65) Prior Publication Data

US 2019/0082218 A1    Mar. 14, 2019

Related U.S. Application Data

(63) Continuation of application No. 15/039,530, filed as application No. PCT/EP2014/075713 on Nov. 26, (Continued)

(51) Int. Cl.
| | |
|---|---|
| *H04N 21/442* | (2011.01) |
| *H04N 21/439* | (2011.01) |
| *H04N 21/472* | (2011.01) |
| *H04N 7/173* | (2011.01) |
| *H04N 7/16* | (2011.01) |

(Continued)

(52) U.S. Cl.
CPC ....... *H04N 21/44213* (2013.01); *H04N 7/162* (2013.01); *H04N 7/17318* (2013.01); *H04N 21/25435* (2013.01); *H04N 21/25891* (2013.01); *H04N 21/2668* (2013.01); *H04N 21/4394* (2013.01); *H04N 21/4758* (2013.01); *H04N 21/47202* (2013.01); *H04N 21/47211* (2013.01);

(Continued)

(58) Field of Classification Search
CPC ....... H04N 21/44213; H04N 21/25891; H04N 21/47211; H04N 21/25435; H04N 21/2668; H04N 21/4758; H04N 21/6582; H04N 21/812; H04N 21/4394; H04N 21/47202; H04N 21/42203; H04N 7/162
See application file for complete search history.

(56) References Cited

U.S. PATENT DOCUMENTS 5,738,527 A * 4/1998 Lundberg ............ G09B 7/02
434/322
6,006,257 A * 12/1999 Slezak ............ H04H 20/103
348/E7.071

(Continued)

*Primary Examiner* — Nasser M Goodarzi
*Assistant Examiner* — Patrick A Ryan
(74) *Attorney, Agent, or Firm* — Holzer Patel Drennan

(57) ABSTRACT

A computer implemented method for detecting user engagement with auxiliary content consumed by a user at a viewing device, the method comprising, at the viewing device generating requests for auxiliary content associated with media content selected by the user to be consumed; receiving auxiliary content from an auxiliary content store and playing out the auxiliary content to the user; displaying at least one user engagement element associated with the auxiliary content, the user engagement element defining an expected user activity; generating user engagement data based on the engagement of a user with the user engagement element in accordance with the expected user activity, and formulating a message to be transmitted to an auxiliary content controller, the messaging including a user identifier and the user engagement data.

20 Claims, 12 Drawing Sheets

Related U.S. Application Data 2014, now Pat. No. 10,075,765, which is a continuation of application No. 14/090,572, filed on Nov. 26, 2013, now abandoned.

(51) Int. Cl.
| | | |
|---|---|---|
| *H04N 21/81* | (2011.01) | |
| *H04N 21/2543* | (2011.01) | |
| *H04N 21/2668* | (2011.01) | |
| *H04N 21/475* | (2011.01) | |
| *H04N 21/658* | (2011.01) | |
| *H04N 21/258* | (2011.01) | |
| *H04N 21/422* | (2011.01) | |

(52) U.S. Cl.
CPC ....... *H04N 21/6582* (2013.01); *H04N 21/812* (2013.01); *H04N 21/42203* (2013.01)

(56) References Cited

U.S. PATENT DOCUMENTS

| | | | | |
|---|---|---|---|---|
| 2006/0206912 | A1* | 9/2006 | Klarfeld | G11B 27/105 725/40 |
| 2007/0050298 | A1* | 3/2007 | Givoly | G06Q 20/123 705/52 |
| 2010/0138852 | A1* | 6/2010 | Hirsch | G06Q 30/02 725/13 |
| 2012/0110619 | A1* | 5/2012 | Kilar | G06Q 30/02 725/34 |
| 2012/0110620 | A1* | 5/2012 | Kilar | G06Q 30/02 725/34 |
| 2012/0174146 | A1* | 7/2012 | Richard | G06Q 20/06 725/24 |
| 2013/0031579 | A1* | 1/2013 | Klappert | H04N 21/454 725/32 |

\* cited by examiner

DELIVERING AUXILIARY CONTENT AND DETERMINING PROPER ENGAGEMENT RESPONSE

BACKGROUND

Computer devices exist which are considered to display content to a user on demand. For example, subscription services allow a user to select particular television channels which are made available to a user device on which a user can view the channels. Viewing of the channels can be subject to payment. When subject to payment, access to the content is controlled by determining whether or not the user has made a payment for the content and as such is permitted to view it. In a subscription service content can be live/linear. Other on-demand content is available, such as, On-Demand TV which allows individual programmes to be begun at the viewer's leisure.

Other types of content are also available on demand, for example, downloaded or streamed to a user following suitable payment, as with On Demand TV or pay per view (PPV).

When using their devices nowadays, users are subject to potentially a very large amount of what is referred to as herein "auxiliary content". This is used to reference content which is not actually requested by a user but which is nevertheless directed to a user and played out at a user device (whether or not the user wants it). User devices include media players, such as digital video players, which are designed to play out at a screen or other output element of a user device auxiliary content which is received at that device in addition to content selected by a user.

Although users have not requested auxiliary content, they are generally tolerant of receiving and playing out a certain amount of auxiliary content, particularly where the receipt and play-out of that auxiliary content means that the user does not have to pay for the content that they did desire to receive. Auxiliary content can be provided in many different forms, including video content, static image, text based content, audio content. Although the present document is focussed mainly on the play-out of full media (video and audio) content, it will be appreciated that other forms of content are also available.

SUMMARY

One aspect of the invention provides a computer implemented method for detecting user engagement with auxiliary content consumed by a user at a viewing device, the method comprising, at the viewing device: generating requests for auxiliary content associated with media content selected by the user to be consumed; receiving auxiliary content from an auxiliary content store and playing out the auxiliary content to the user; displaying at least one user engagement element associated with the auxiliary content, the user engagement element defining an expected user activity; generating user engagement data based on the engagement of a user with the user engagement element in accordance with the expected user activity, and formulating a message to be transmitted to an auxiliary content controller, the messaging including a user identifier and the user engagement data.

In one embodiment the user engagement element comprises a displayed question to which a user may respond and has an input for receiving a response, wherein the expected user activity comprises providing an appropriate response to the question.

The user engagement element can comprise a survey which includes at least one question with associated expected responses, wherein the questions and responses concern the auxiliary content.

The user response can be by voice detected by a voice recognition application and compared with an expected response, or by text input or by any other suitable input means.

In another embodiment the user engagement element comprises a user interface component selectable by a user.

In one form, the user interface component is a display region on a display of a viewing device, the display region comprising an auxiliary content item and being clickable by a user.

In another form the user engagement element displays multiple display regions, each displaying an image, wherein one of the images is linked to the played out auxiliary content, and the expected user activity is to select that image.

The image which is linked to the played out auxiliary content can be an image which was viewed by the user when consuming the auxiliary content.

Another aspect of the invention provides a content providing computer component comprising an interface for communicating with a user device; a user engagement element generator operable to receive a request from the user device and to transmit a user engagement element to the user device via the interface; an engagement monitoring component configured to monitor user engagement data received from the user device and to generate control data from the user engagement data; and storing the control data in association with the user identifier associated with the user device.

The engagement monitoring component can be configured to assess if an expected user response has been received from the user device following engagement with the user engagement element.

The component can be configured to transmit auxiliary content identifiers to the user device, wherein the user engagement element is associated with a piece of auxiliary content.

The user engagement element generator can be operable to receive requests from multiple devices and to generate multiple user engagement elements associated with a piece of auxiliary content, and to receive user engagement data from said multiple devices.

The content control module can be configured to receive a request for content and to select content based on the control data for the user device identified by the user identifier.

In one embodiment, the content comprises pieces of auxiliary content, and the control data governs the frequency with which a same piece of auxiliary content is transmitted to the user device.

Alternatively or additionally the control data governs the number of pieces of auxiliary content which are transmitted to the user device identified by the user identifier, whereby the number of pieces of auxiliary content which are transmitted to the user device is reduced based on expected user engagement by the user with the user engagement element, and/or the control data governs the type of auxiliary content which is transmitted to the user device identified by the user identifier.

The invention also provides a computer program product comprises program code means which when executed by a processor at a user device implement the method steps of any of the preceding method.

In another aspect the method comprises reducing the number of advertisements to be viewed provided that the user properly engages with the user engagement element.

Another aspect provides a method of controlling access to content to be viewed on a viewing device: wherein a user selects desired content to be viewed on the viewing device, the method comprising, prior to displaying the desired content, displaying at least one user engagement element defining an expected user activity, the user engagement element including at least one question and a response entry component for receiving a response from the user concerning user profile information, detecting if a user has engaged with the user engagement element to supply user profile information, and releasing the desired content for viewing in that case, and causing the user profile information to be utilised in the selection of auxiliary content to be displayed at the viewing device.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Figure 1:
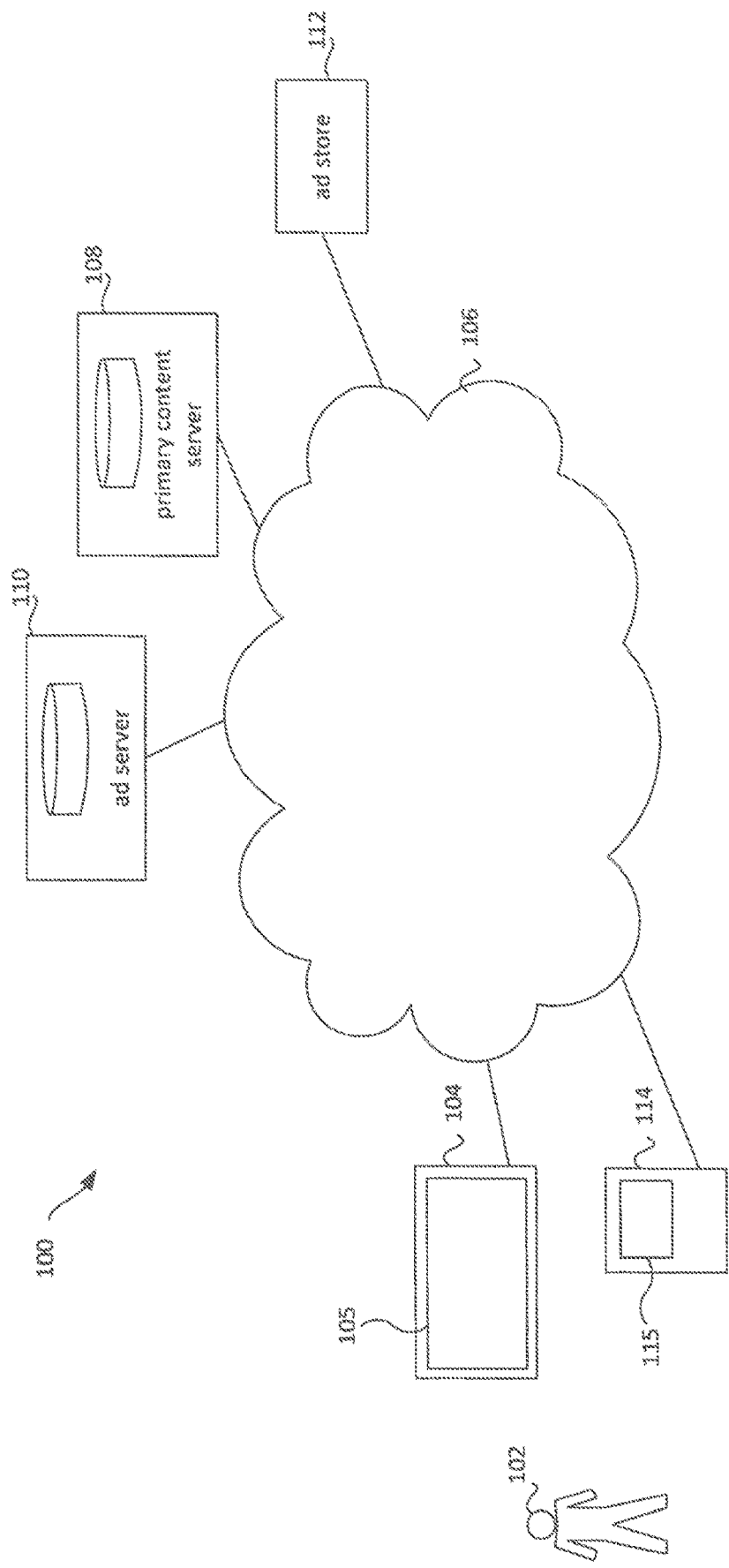
FIG. 1 shows a content delivery system.

Reference is first made to FIG. 1 to show the infrastructure within which embodiments of the invention are implemented.

FIG. 1 shows a content delivery system 100. A content consuming user 102 (current content consumer) operates a media playback device 104 with a display 105 that is capable of connecting to a computer network 106 of the content delivery system 100. The user device is a computer device in the form of, for example, a television, smartphone device, tablet computing device, etc. The computer network 106 is a packet-based network such as the Internet in this embodiment but may not be packet-based in other embodiments.

The content consuming user 102 may also have a companion user device 114 with a display. This companion user device 114 can take the form of any kind of computer device including but not limited to tablets, mobile phones, smartphones, laptops, etc. A playback application for output of content and user engagement data is executed by a processor of the companion user device 114.

Both the media playback device 104 and the companion user device 114 have a network connection for connecting to the computer network 106. The network connection can be wired such as Ethernet or wireless (WiFi, GSM etc.), or any suitable interface which allows communication with the network 106. The media playback device 104 and the companion user device 114 may connect to the computer network 106 using the same type of network connection or different types of network connections.

Connected to the network 106 is a primary content providing server 108 of the content delivery system 100 which holds primary (desired) content for delivering to users of the content delivery system 100. The media content is stored in the form of a collection of media assets (that is, individual pieces of media content), each media asset being, for example, an episode of a television show, a movie, or a recording of a sports event (e.g. football match) etc.

Also connected to the network 106 is an auxiliary content providing server 110 of the content delivery system 100 which holds an auxiliary content database identifying different pieces of auxiliary content (e.g. video content, static image content, text-based content, audio content etc.) that can be delivered to users of the content delivery system 100. For example, in some embodiments the database is a database of network locations (e.g. web addresses in the form of a Uniform Resource Locators (URLs)) at which the auxiliary content is available. One particular type of auxiliary content is advertising content. In particular embodiments, the server 110 is an ad ("advertisement") server holding a database of advertising content.

Also connected to the network 106 is one or more auxiliary content store 112 that stores the auxiliary content described above. Each of the one or more auxiliary content stores may be addressable for example using a URL referred to above.

Figure 2:
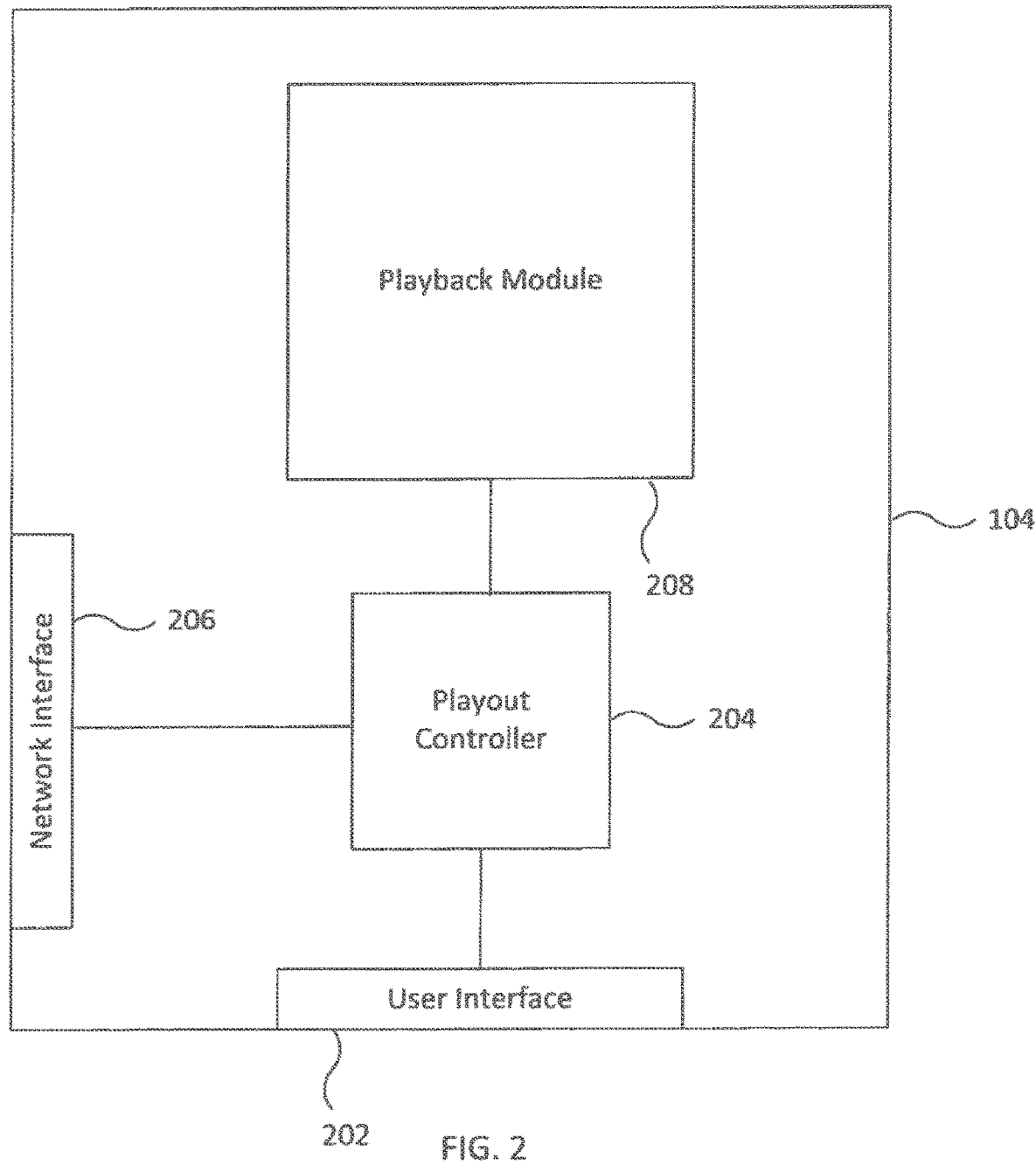
FIG. 2 shows a schematic view of a media playback device.

FIG. 2 is a schematic block diagram of the media playback device 104.

The media playback device 104 comprises a user interface 202 for receiving user inputs from the content consuming user 102. The user interface 202 may take various forms, for example an infra-red (IR) receiver for receiving control signals from an IR remote control unit operated by the content consuming user 102, a touch-screen of the media playback device 104, or another input device such as a keypad, mouse, or microphone (for receiving voice commands).

The media playback device 104 is arranged to display media content that is available for selection by the content consuming user 102 on the display 105 of the media playback device 104. A content consuming user 102 is able to select desired media content that they wish to consume by supplying an input that is received by the user interface 202.

The media playback device 104 comprises a playout controller 204 that is coupled to the user interface 202 which enables the playout controller 204 configured to detect that a selection of desired media content has been made by the content consuming user 102.

The media playback device 104 further comprises a network interface 206 for connecting to the computer network 106. The network interface 206 can be wired interface such as an Ethernet interface, a wireless interface (WiFi, GSM etc.), or any other suitable interface which allows communication with the network 106.

In response to detecting a selection of desired media content by the content consuming user 102, the playout controller 204 is configured to transmit a request for the desired media content over the network 106 to the primary content server 108, and in response, receive the desired media content from the primary content server 108.

The playout controller 204 is configured to supply the desired media content to a playback module 208 of the media playback device 104 for playout to the content consuming user 102. For example, if the desired media content is video content (e.g. a TV episode), the playback module 208 handles the output of the desired media content to the display 105.

Embodiments of the present disclosure relate to the delivery of desired media content that is associated with auxiliary content that is to be played out to the content consuming user 102 (by the playback module 208 of the media playback device 104, or by the companion user device 114).

For example, if the desired media content is video content this video content may have an ad break pattern that defines cue points at which advertising content is to be inserted into the playout stream.

During playback of the desired media content the playout controller 204 is configured to detect when one these break points is approaching and in response to this detection, transmit a request for advertising content information (an advert manifest) to the auxiliary content server 110 via the network interface 206 over the network 106, and in response, receive advertising content information (the advert manifest) from the auxiliary content server 110. The advertising content information includes, for each piece of advertising content that is to be played, an identifier of a network storage location in the network 106 where the advertising content is stored and other metadata associated with the piece of advertising content. The identifier referred to above may comprise a URL used to access the advertising content that is stored on an auxiliary content store 112. The metadata referred to above may include information on how the advertising content is to be played and one or more tracking events that are to be reported to the auxiliary content server 110 when the event is detected by the playout controller 204 as the advertising content is played. The tracking event reports allow the auxiliary content server 110 to measure which pieces of advertising content were started, which failed because the ad creative was unavailable; which piece(s) of advertising content were watched all the way through; which piece(s) of advertising content only reached the half-way point before the viewer quit playback etc.

The playout controller 204 may interact with the auxiliary content server 110 in accordance with the Video Ad Serving Template (VAST) specification released by the Interactive Advertising Bureau (IAB). That is, the request for advertising content information transmitted to the auxiliary content server 110 may be a VAST request, and the advertising content information received from the auxiliary content server 110 may be a VAST response document (an XML document).

In response to receiving the advertising content information (the advert manifest) from the auxiliary content server 110, the playout controller 204 is configured to retrieve the advertising content from the auxiliary content store(s) 112 using the identifier(s) referred to above, and control the playout of the retrieved advertising content by the playback module 208 during the break points referred to above. The inventors have identified that the content consuming user 102 may be consuming the desired content within limits of a constrained resource. For example the content consuming user 102 may have limited time available to consume the desired media content. If the media playback device 104 is a mobile device, this may be due to the media playback device 104 having a limited amount of power (battery life) remaining at the time the content consuming user 102 selected to consume the desired media content. Alternatively or additionally, the user 102 may be consuming the desired content within bandwidth constraints of the network connection between the media playback device 104 and the network 106.

Embodiments of the present invention enable a device to deliver desired content to a user so that the content consuming user 102 can consume the desired media content within the limits of the constrained resource even when that content is associated with auxiliary content that should be played out. This result is achieved by allowing auxiliary content data to be controlled based on monitoring user engagement data which allows accruement of reward points by the content consuming user 102 based on the content consuming user 102 consuming (e.g. watching, listening) auxiliary content or engaging with auxiliary content which allows adaption of auxiliary content for that content consuming user 102

Components in the network 106 which enable the content consuming user 102 to consume desired media content within the limits of a constrained resource are now described with reference to FIGS. 3*a* and 3*b*.

Figure 3A:
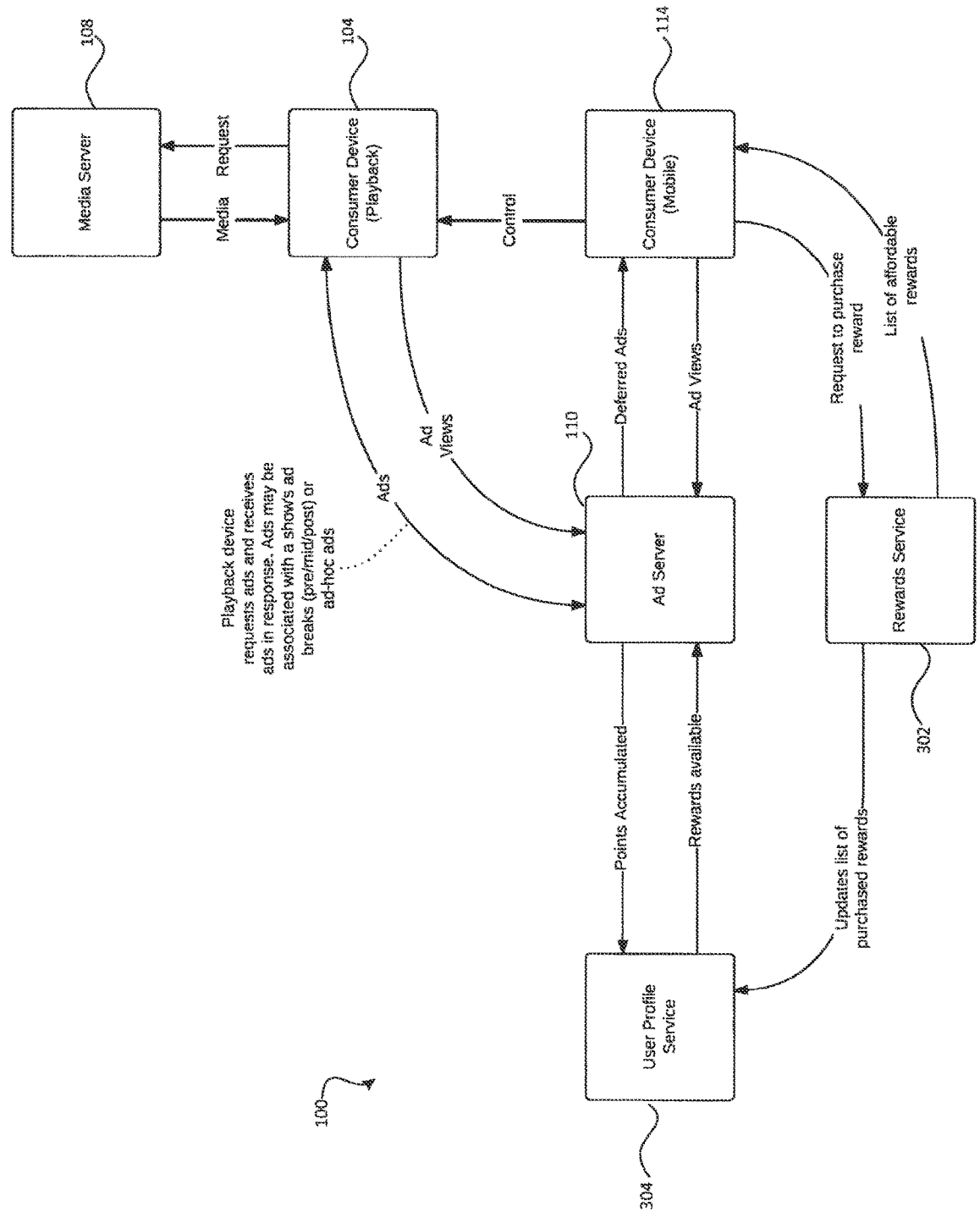
FIGS. 3a and 3b illustrate network components in the content delivery system.
Figure 3B:
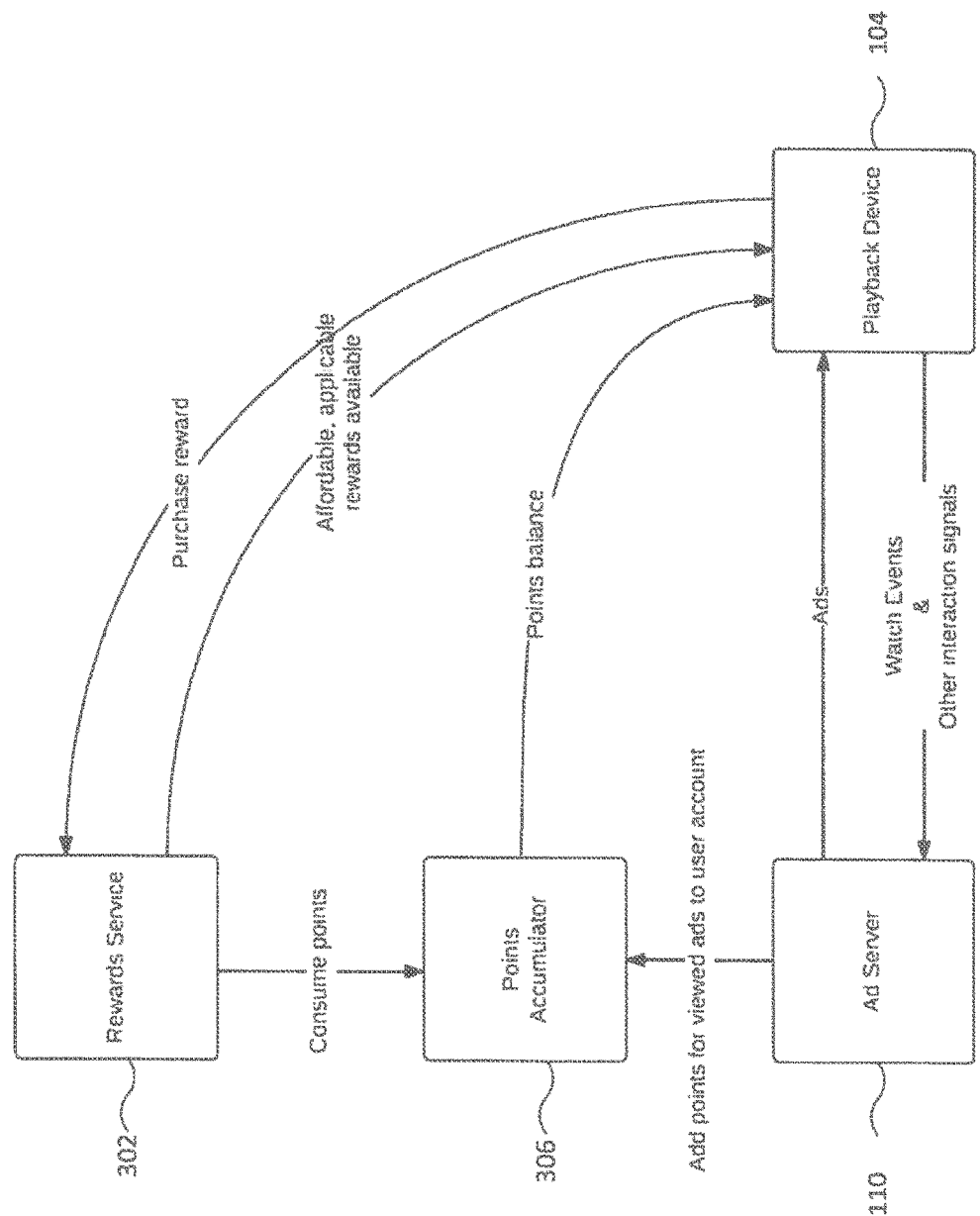

FIGS. 3*a* and 3*b* illustrates components of the content delivery system 100 described above with reference to FIG. 1 (i.e. the media playback device 104, companion user device 114, primary content server 108 and auxiliary content providing server 110).

In addition FIG. 3*a* illustrates a rewards service component 302 and a user profile service component 304. The rewards service component 302 may be implemented on a dedicated server connected to the network 106, alternatively the functionality of the rewards service 302 may be implemented on the auxiliary content providing server 110. Similarly, the user profile service component 304 may be implemented on a dedicated server connected to the network 106, alternatively the functionality of the user profile service 304 may be implemented on the auxiliary content providing server 110. Implementation of the rewards service component 302 and a user profile service component 304 on a network entity such as a server provides security against malicious users attempting to edit the information stored by these components.

FIG. 3*b* illustrates a reward points accumulator component 306. The reward points accumulator component 306 may be implemented on a dedicated server connected to the network 106, the server described above implementing the rewards service 302 functionality, or on the auxiliary content providing server 110.

FIGS. 3*a* and 3*b* illustrate the data that is transmitted between the components of the content delivery system 100. For example, FIG. 3*a* illustrates that the media playback device 104 is configured to transmit a request for desired media content over the network 106 to the primary content server 108, and in response, receive the desired media content from the primary content server 108 (described above). Furthermore, FIGS. 3*a* and 3*b* illustrates that the media playback device 104 is configured to transmit a request for auxiliary content to the auxiliary content server 110 over the network 106, and in response, receive auxiliary content from the auxiliary content server 110.

Other data that is transmitted between the components of the content delivery system 100 shown in FIGS. 3a and 3b is described below with reference to embodiments of the present invention Reference is now made to FIG. 4 which illustrates a process 400 performed by the auxiliary content providing server 110 for associating reward points with a media consumption account associated with the content consuming user 102. The user profile service 304 is configured to maintain information on accumulated reward points and available rewards for each user of the content delivery system 100.

At step S402, the auxiliary content providing server 110 detects that the content consuming user 102 has consumed or interacted with a piece of auxiliary content played out on the media playback device 104.

The auxiliary content providing server 110 is able to detect that the content consuming user 102 has consumed auxiliary content based on one or more tracking event reports received from the media playback device 104. This is illustrated by the "ad views" data flow shown in FIG. 3a and the "watch events" data flow shown in FIG. 3b.

The auxiliary content providing server 110 may detects that the content consuming user 102 has interacted with a piece of auxiliary content using one or more methods that are described below. In a first method, after playback of auxiliary content on the media playback device 104 (detected by the auxiliary content providing server 110 based on a tracking event report received from the media playback device 104), the auxiliary content providing server 110 transmits a user engagement request to the companion user device 114 which causes a user engagement element to be shown on the display 115 of the companion user device 114 in the form of a question displayed to the content consuming user 102. The content consuming user 102 can engage with the user engagement element by supplying an input e.g. by responding to the question either by entering data into a field displayed to the content consuming user 102, or responding using voice (detected by a microphone of the companion user device 114), or responding by making a gesture. When the content consuming user 102 responds using voice or gesture, the playback application executed by the processor of the companion user device 114 detects the voice/gesture and recognises the user response.

After this user engagement, a user engagement response is transmitted from the companion user device 114 to the auxiliary content providing server 110. This is illustrated by the "Ad views" data flow shown in FIG. 3a.

The auxiliary content providing server 110 detects whether or not the content consuming user 102 has responded properly by assessing whether an expected user actuation has been executed. For example, where a response is to be entered in text, the quality of the text is assessed to ensure it is meaningful. Where a user selection is made (multiple choice), only the set number of selections should be made.

The user engagement element can comprise a survey which includes multiple questions with associated fields for responses, wherein the questions and responses concern the auxiliary content. The user engagement element can take alternative forms to a survey requiring text responses. It would be a kind of game, or multiple choice. Any kind of user engagement element permitting a monitorable user response is envisaged.

In the above embodiment, the companion user device 114 operates to select the desired content and operates to display the auxiliary content (for example, the advertisement) and the user engagement elements (such as the survey). However, the principles described herein can also be applied to a scenario where there is a single device which both plays the desired content, the auxiliary content and the user engagement element. That same device can be used to select the content. A further alternative is to have a companion device used to select the content, where the desired content, auxiliary content and user engagement elements are displayed on a separate device. In yet a further alternative, auxiliary content and user engagement elements are displayed on a plurality of devices if a group of viewers is present. This enables the auxiliary content, and therefore the user engagement elements to be tailored to each of the viewers in the group. This enables each of the viewers to receive auxiliary content and user engagement elements that is potentially customised for them explicitly. For example, a television advert for a clothes retailer displayed on the media playback device 104 might have a secondary experience on a mobile device that shows men's clothes to male viewers and ladies' clothes to female viewers.

Where one device is used to display the desired content, the auxiliary content and the user engagement elements, two separate display portions or a picture in picture technology can be utilised. Alternatively, the auxiliary content can be displayed first, followed by the user engagement element and then followed by the desired content on the same screen.

In a second method, during playback of auxiliary content on the media playback device 104 (detected by the auxiliary content providing server 110 based on a tracking event report received from the media playback device 104), the auxiliary content providing server 110 transmits a user engagement request to the media playback device 104 which causes a user engagement instruction to be output from the media playback device 104 to the content consuming user 102. For example an audible user engagement instruction may be output from speakers of the media playback device 104 or a visual user engagement instruction may be shown on the display 114 of the media playback device 104. The user engagement instruction encourages the content consuming user 102 to make a selection in an area of the display 114 where the auxiliary content is being displayed. For example, if the auxiliary content is a car advert the user engagement instruction may ask the content consuming user 102 to tap a colour or car model that they prefer, or ask them to sign-up for a trial period by tapping a specific area of the display 104. Whilst auxiliary content is described in this example as advertising content, the auxiliary content is not limited to being advertising content, the auxiliary content may for example be a trailer for a movie or a TV programme.

The content consuming user 102 can engage with the auxiliary content by supplying an input to the user interface 202 e.g. by responding to the user engagement instruction by tapping a specific area of the display 105. When the content consuming user 102 responds, the media playback device 104 is configured to transmit a user engagement response to the auxiliary content providing server 110. This is illustrated by the "Interaction signal" data flow shown in FIG. 3b.

Figure 5A:
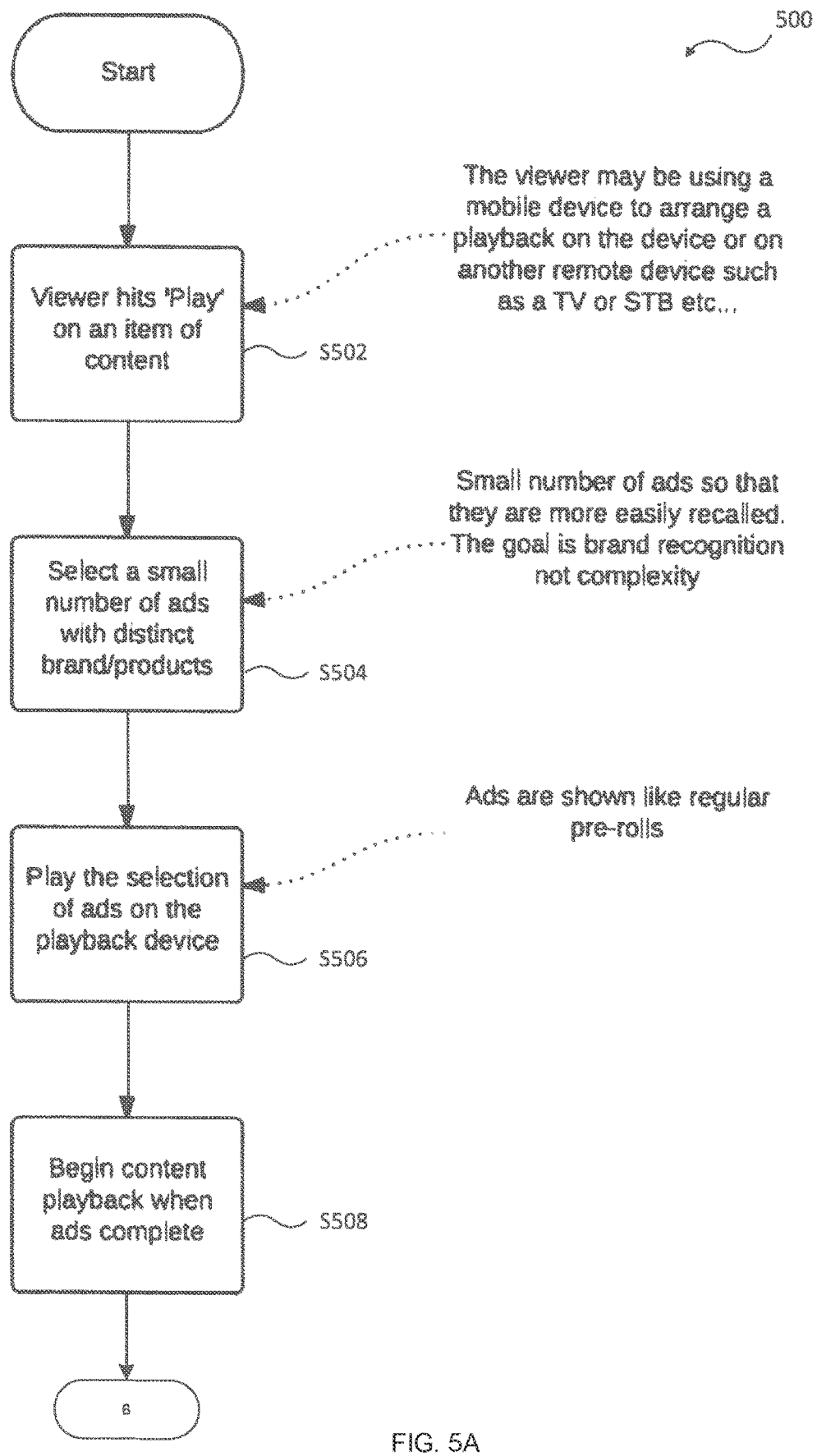
FIGS. 5a and 5b illustrates a flow chart for a process of detecting user engagement of auxiliary content.

The auxiliary content providing server 110 detects whether or not the content consuming user 102 has responded properly by assessing whether an expected user actuation has been executed. A third method of how the auxiliary content providing server 110 may detect that the content consuming user 102 has interacted with a piece of auxiliary content is described with reference to FIGS. 5a and 5b.

At step S502, the content consuming user 102 selects to consume an item of media content. As described above, in response to detecting this selection, the playout controller 204 is configured to transmit a request for the desired media content over the network 106 to the primary content server 108, and in response, receive the desired media content from the primary content server 108.

In response to the playout controller 204 determining that the desired media content is associated with pre-roll auxiliary content then the playout controller 204 is configured to transmit a request for pre-roll auxiliary content (an advert manifest) to the auxiliary content server 110. At step S504, in response to receiving this request, the auxiliary content server 110 selects auxiliary content that should be played out by the media playback device 104 before the start of their chosen media content (i.e. select "pre-roll" auxiliary content). The selected auxiliary content may be associated with the media content's pre-roll break for auxiliary content. Alternatively, the selected auxiliary content may not be associated with the media content's pre-roll break for auxiliary content i.e. the selected auxiliary content is ad-hoc auxiliary content.

After step S504, the auxiliary content server 110 is configured to transmit auxiliary content information to the media playback device 104. The auxiliary content information includes, for each piece of selected auxiliary content, an identifier of a network storage location in the network 106 where the selected auxiliary content is stored and other metadata associated with the piece of auxiliary content. At least one of these pieces of selected auxiliary content is indicated as being associated with a user engagement feature, for example using a flag or other type of identifier.

In response to receiving the advertising content information from the auxiliary content server 110, the media playback device 104 is configured to retrieve the selected auxiliary content from the auxiliary content store(s) 112 using the identifier(s) in the received advertising content information, and at step S506 control the playout of the retrieved auxiliary content by the playback module 208 prior to playout of the selected media content.

Once playout of the auxiliary content at step S506 is complete the playout controller 204 is configured to control the playback module 208 to playout the desired media content (retrieved from the primary content providing server 108) at step S508.

Having played out the auxiliary content that is associated with the user engagement feature at step S506, playout controller 204 is configured to the wait for a period of time at step S510 whilst the desired media content is being played out, before proceeding to step S512. This period of time may be a function of the length of the desired media content and/or the placement of any first mid-roll in the desired media content.

The playout controller 204 is configured to detect at step S510, that the period of time has elapsed since playout of the desired media content to the content consuming user 102 was started by the playback module 208.

At step S512, the auxiliary content server 110 is configured to transmit user engagement data associated with a piece of selected auxiliary content to the companion user device 114 which causes user engagement options 604 to be shown on the display 115 of the companion user device 114 (S512a) and a user engagement element 602 to be shown on the display 115 of the companion user device 114 in the form of a question displayed to the content consuming user 102 (S512b).

Figure 6:
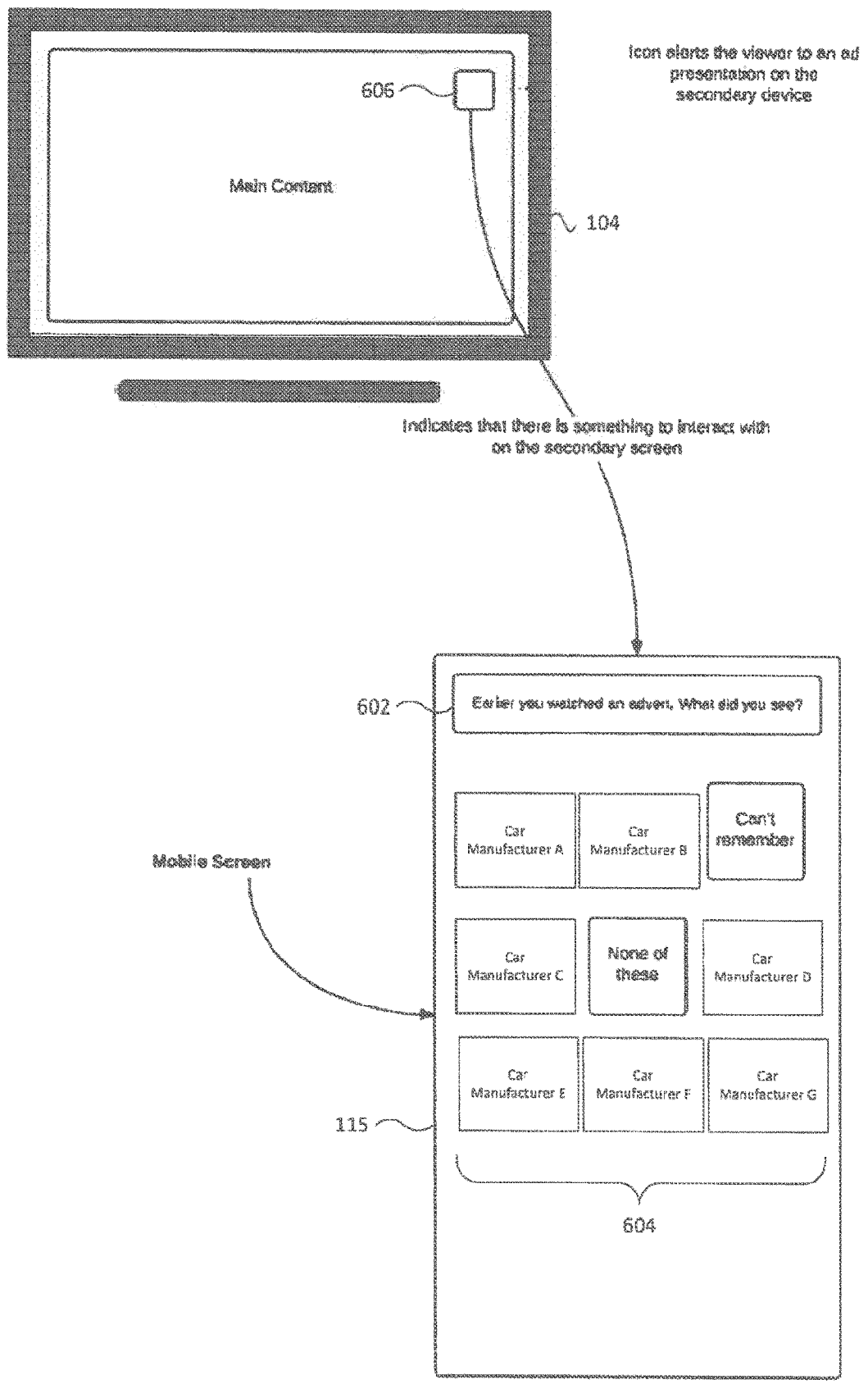
FIG. 6 illustrates transmission of user engagement data to the media playback device and a companion device associated with the content consuming user.

The display of the user engagement element 602 and the user engagement options 604 on the display 115 of the companion user device 114 is shown in FIG. 6.

The content consuming user 102 can select one of the user engagement options 604 by tapping a specific area of the display 115 corresponding to a user engagement option 604.

As shown in FIG. 6, the media playback device 104 may display a user engagement icon 606 on display 104 during playout of the selected media content. The user engagement icon 606 alerts the content consuming user 102 that user engagement information is presented on the companion user device 114 i.e. there is something to interact with on the second screen.

As shown in FIG. 6, the user engagement element 602 prompts the content consuming user to select a user engagement options that corresponds to a piece of auxiliary content previously played out by the playback module 208 prior to the desired media content at step S506.

One of the user engagement options 604 may correspond to a piece of selected auxiliary content (previously played out by the playback module 208 prior to the desired media content at step S506). One or more other user engagement options 604 do not correspond to the piece of selected auxiliary content, these other user engagement options correspond to other pieces of selected auxiliary content not played out prior to the desired media content. The user engagement options 604 may also include an option for the content consuming user 102 to indicate that they cannot remember what auxiliary content was played out prior to the desired media content, and/or an option for the content consuming user 102 to indicate that none of the user engagement options 604 correspond to auxiliary content that was played out prior to the desired media content.

As a mere example to illustrate the concept, if the auxiliary content played out at step S506 includes advertising content for a car manufactured by a car manufacturer (e.g. car manufacturer A) then one of the user engagement options 604 may be a logo for the car manufacturer A and the other user engagement options 604 may be logos for other car manufacturers that manufacture cars not featured in the advertising content.

The content consuming user 102 can respond to the user engagement element 602 at their leisure, so they are not unduly distracted from the main content output by the media playback device 104. The first opportunity to recall a brand/product may not occur within the first few minutes of the main content (being output) due to step S510 being performed. The content consuming user 102 can respond as the interactions are presented to them, or all at once, or at the end of the main content, or whenever the content consuming user 102 chooses.

When the content consuming user 102 responds, the media playback device 104 is configured to transmit a user engagement response to the auxiliary content providing server 110. This is illustrated by the "Interaction signal" data flow shown in FIG. 3b.

The auxiliary content providing server 110 detects whether or not the content consuming user 102 has responded properly by assessing whether an expected user actuation has been executed (for example whether the content consuming user 102 has successfully recalled a brand or logo associated with auxiliary content displayed at step S506).

In one embodiment the period of time referred to above is greater than five minutes to ensure that the brand or logo is really being recalled.

Figure 4:
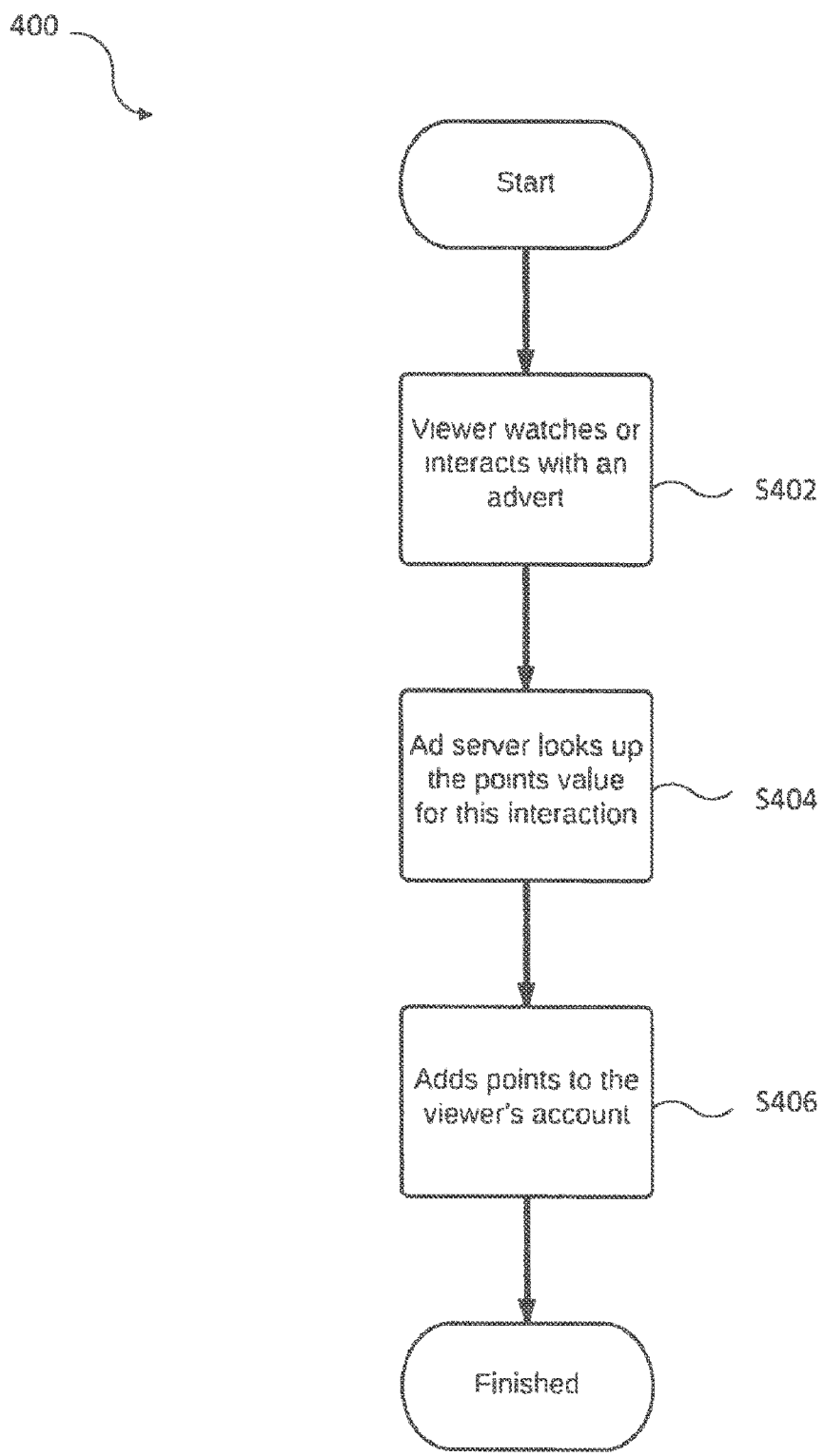
FIG. 4 illustrates a flow chart for a process of associating reward points with an account associated with a content consuming user.

Referring back to the process 400 shown in FIG. 4, once the auxiliary content providing server 110 detects that the content consuming user 102 has interacted with a piece of auxiliary content in accordance with expected activity the process 400 proceeds to step S404 where the auxiliary content providing server 110 determines the reward point value for the consumption or interaction with auxiliary content detected at step S402. Reward points provided based on the content consuming user 102 consuming auxiliary content may be lower than the reward points provided based on the content consuming user 102 interacting with auxiliary content. In terms of consumption (e.g. viewing/listening) of auxiliary content, auxiliary content that is longer in length than other shorter auxiliary content may earn the content consuming user 102 more reward points than consumption of the shorter auxiliary content. In terms of interacting with auxiliary content, auxiliary content that require more detailed interactions may earn the content consuming user 102 more reward points than auxiliary content that require simpler interactions.

At step S406, the auxiliary content providing server 110 communicates the reward point value determined at step S404 to the user profile service 302 so that the reward point value determined at step S404 are added to reward point balance associated with a media consumption account associated with the content consuming user 102. This is illustrated by the "Points accumulated" data flow shown in FIG. 3a.

The auxiliary content providing server 110 communicates the reward point value determined at step S404 to the reward point accumulator 306 this is illustrated by the "Add points for viewed ads to user account" data flow shown in FIG. 3b. This enables the reward point accumulator 306 to communicate the reward point balance of each user of the content delivery system 100 to the respective users. FIG. 3b illustrates the reward point accumulator 306 communicating the reward point balance of the content consuming user 102 to the media playback device 104 by way of the "Points balance" data flow.

Figure 5B:
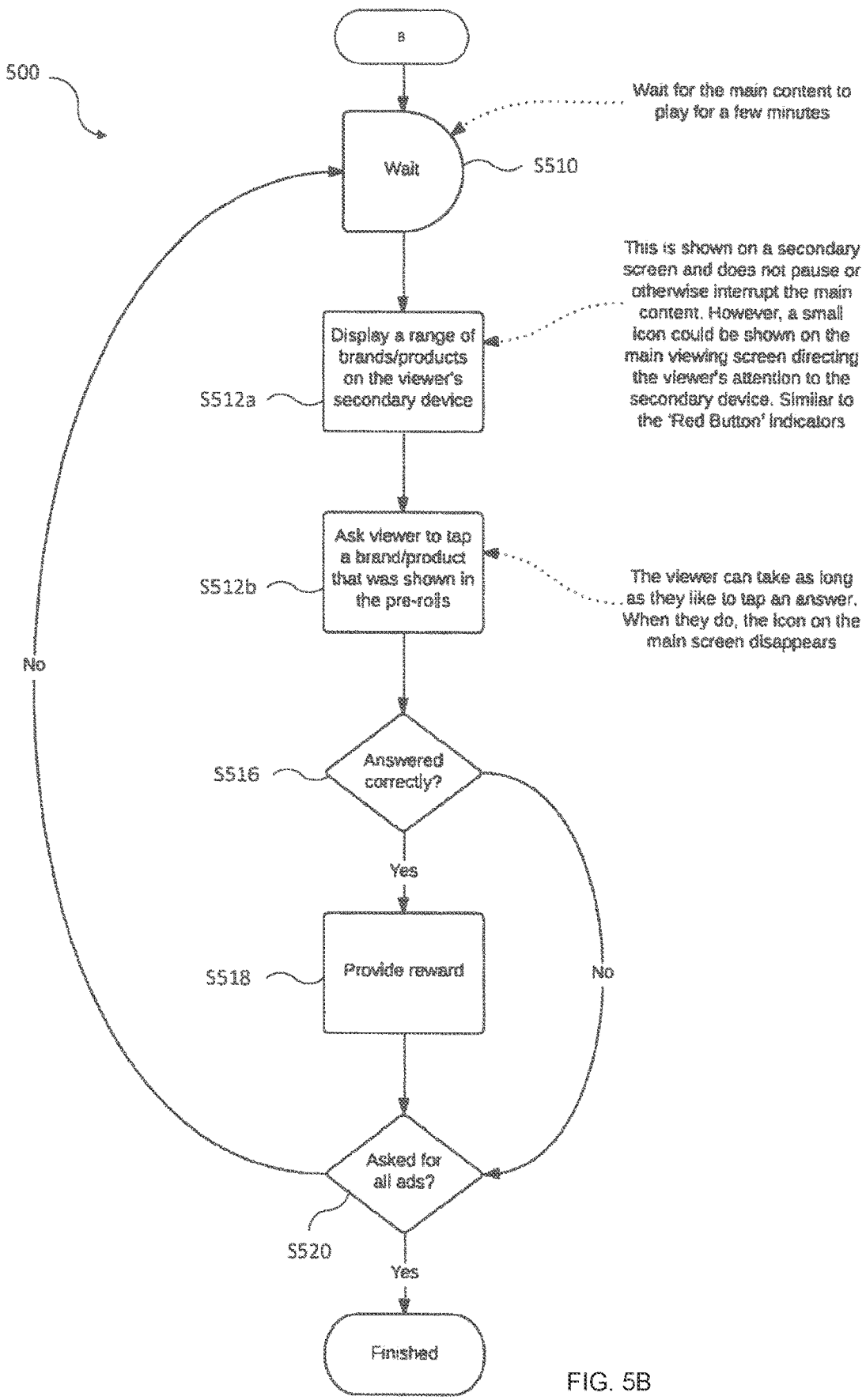

Referring back to the process 500 illustrated in FIG. 5b, this reward point issuance is performed at step S518.

In response to the determination at step S510, for each selected auxiliary content played out by the playback module 208 at step S506 prior to the playout of the desired media content at step S508, the auxiliary content server 110 is configured to perform steps S512a, S512b, S516, and S518. This is controlled by the auxiliary content server 110 performing a check at step S520 to determine whether user engagement data for each piece of selected auxiliary content played out at step S506 has been transmitted to the companion user device 114.

In order to consume desired content within limits of a constrained resource, the content consuming user 102 is able to redeem accumulated reward points on rewards that enhance the overall content consumption experience of the content consuming user 102. Embodiments discussed below enable flexibility as to when redemption of accumulated reward points may occur.

Prior to selection of desired media content, the content consuming user 102 may redeem accumulated reward points on one or more rewards.

A list of rewards available for redemption by the content consuming user 102 is communicated from the rewards service 302 to either the media playback device 104 or the companion user device 114 associated with the content consuming user 102 for display to the content consuming user 102. This is illustrated by the "list of affordable rewards" data flow shown in FIG. 3a (list of rewards communicated to the companion user device 114) and the "affordable, applicable rewards available" data flow shown in FIG. 3b (list of rewards communicated to the media playback device 104).

Each reward in the list of rewards is associated with a number of reward points required to redeem the reward. By a device (the media playback device 104 or the companion user device 114) having access to the list of rewards (and the reward point value associated with each reward in the list) and the reward point balance associated with the media consumption account of the content consuming user 102, the device is able to display a subset of rewards (in the list of rewards) to the content consuming user 102, the reward point value associated with each reward in the subset of rewards having a reward point value equal to or less than the reward point balance associated with the media consumption account of the content consuming user 102.

Each reward in the list of rewards is also associated with an expiry time period after which the reward expires.

The list of rewards may include for example that (i) no mid-roll auxiliary content (auxiliary content that is required to be output during output of desired media content) in TV shows for 48 hours (following redemption), (ii) no pre-roll auxiliary content (auxiliary content that is required to be output prior to output of desired media content) before TV shows for 48 hours (following redemption), (iii) no mid-roll auxiliary content in movies for 48 hours (following redemption) etc.

It will be appreciated that the above described rewards are merely examples. Whilst each of the described rewards has the same expiry time period, the rewards list may include rewards that are associated with different expiry time periods. Whilst each of the described rewards is associated with a particular content type (e.g. TV show, movie), the rewards list may include rewards that are not associated with a particular content type (e.g. no mid-roll auxiliary content in all media content for 48 hours).

When a reward is purchased by the content consuming user 102 by making a selection on the media playback device 104 or the companion user device 114, this reward purchase is communicated to the rewards service 302. This is illustrated by the "request to purchase reward" data flow shown in FIG. 3a (selection of reward made using companion user device 114) and the "purchase reward" data flow shown in FIG. 3b (selection of reward made using the media playback device 104).

When a reward is purchased by the content consuming user 102, the rewards service 302 is configured to communicate this purchase to the user profile service 304. This is illustrated by the "updates list of purchased rewards" data flow shown in FIG. 3a.

When a reward is purchased by the content consuming user 102, the rewards service 302 is also configured to communicate this purchase to the reward point accumulator 306 this is illustrated by the "consume points" data flow shown in FIG. 3b. This enables the reward point accumulator 306 to communicate the updated reward point balance of the content consuming user 102 to the media playback device 104 by way of the "Points balance" data flow.

When the auxiliary content providing server 110 is required to select auxiliary content for the content consuming user 102, the auxiliary content providing server 110 is configured to ask the user profile service 304 for details of any currently valid rewards that have been purchased by the content consuming user 102. In response, the user profile service 304 is configured to communicate details of currently valid rewards to the auxiliary content providing server 110. This is illustrated by the "rewards available" data flow shown in FIG. 3*a*.

Figure 7:
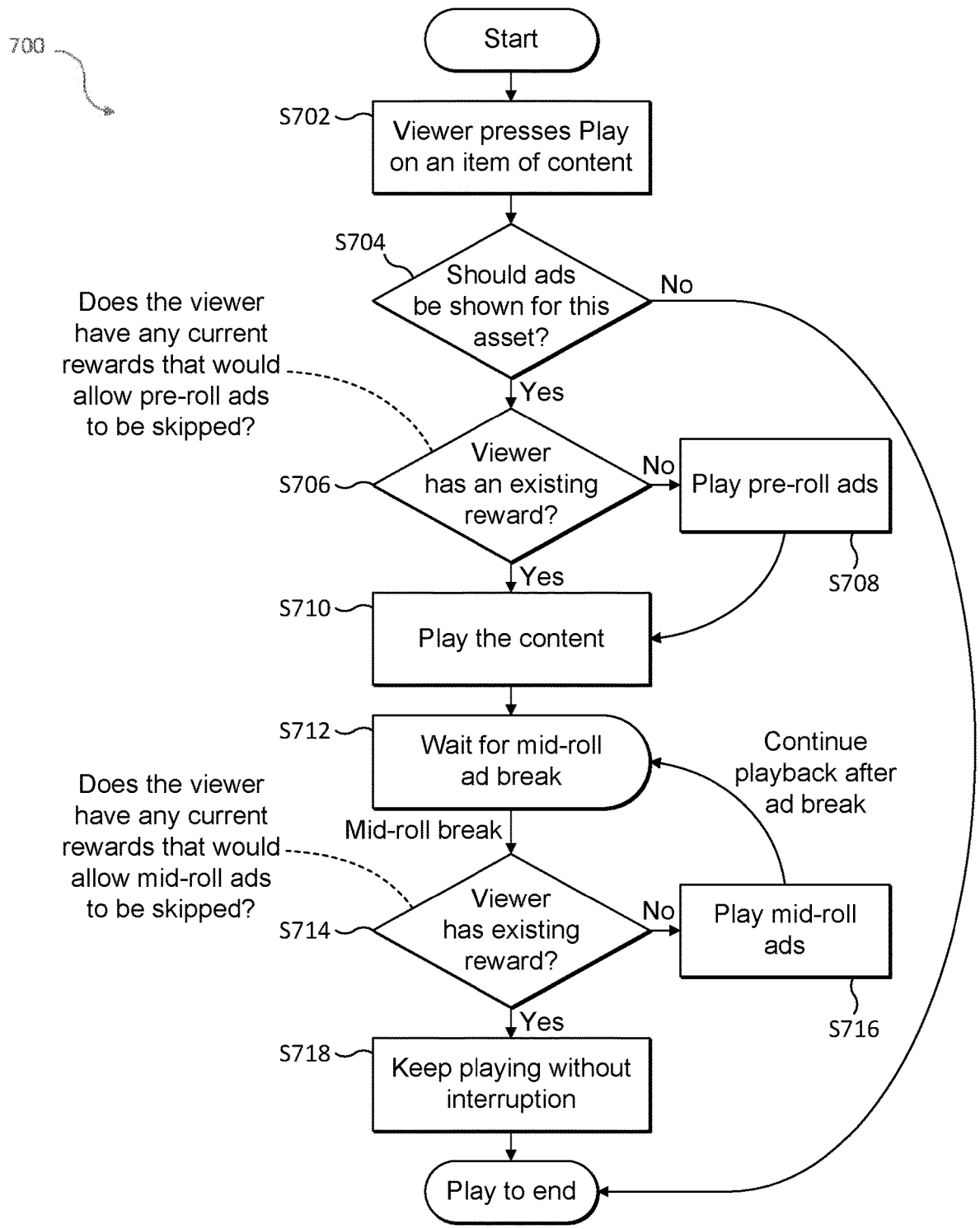
FIG. 7 illustrates a flow chart for a process that enables that the content consuming user to consume desired media content within the limits of a constrained resource.

Reference is now made to FIG. 7 which illustrates a process 700 that enables that the content consuming user 102 to consume desired media content within the limits of the constrained resource.

At step S702, the content consuming user 102 selects to consume an item of media content. As described above, in response to detecting this selection, the playout controller 204 is configured to transmit a request for the desired media content over the network 106 to the primary content server 108, and in response, receive the desired media content from the primary content server 108.

At step S704, the playout controller 204 is configured to determine whether the desired media content is associated with auxiliary media content. If at step S704, the playout controller 204 determines that the desired media content is not associated with auxiliary media content then the process 700 ends, otherwise the process proceeds to step S706.

If the playout controller 204 determines that the desired media content is associated with auxiliary content then the playout controller 204 is configured transmit a request for auxiliary content (an advert manifest) to the auxiliary content server 110.

The auxiliary content server 110 determines whether the content consuming user 102 has any current rewards that would allow auxiliary content to be skipped for the desired media content. The auxiliary content server 110 is configured to look up what rewards the content consuming user 102 has purchased (that have not expired) using the "rewards available" data received from the user profile service 304.

If the auxiliary content server 110 determines that the content consuming user 102 does not have any current rewards that would allow any auxiliary content to be skipped for the desired media content, the auxiliary content server 110 generates advertising content information (e.g. an advert manifest) which contains details of sets of auxiliary content that is to played out during each break for auxiliary content in the desired media content, together within a timing offset within the desired media content at which each set of auxiliary content is to be played out by the media playback device 104.

If the auxiliary content server 110 determines that the content consuming user 102 has a current reward that allows pre-roll auxiliary content to be skipped for the desired media content in generating the advertising content information (e.g. the advert manifest) the auxiliary content server 110 is configured to not include any information pertaining to pre-roll auxiliary content in the advertising content information based on this determination.

If the auxiliary content server 110 determines that the content consuming user 102 has a current reward that allows mid-roll auxiliary content to be skipped for the desired media content in generating the advertising content information (e.g. the advert manifest) the auxiliary content server 110 is configured to not include any information pertaining to mid-roll auxiliary content in the advertising content information based on this determination.

If the auxiliary content server 110 determines that the content consuming user 102 has a current reward that allows post-roll auxiliary content to be skipped for the desired media content in generating the advertising content information (e.g. the advert manifest) the auxiliary content server 110 is configured to not include any information pertaining to post-roll auxiliary content in the advertising content information based on this determination.

A reward may be limited to pre/mid/post rolls, or a particular genre of content or to prime-time viewing (or not), an individual piece of content (a first run movie for example) etc.

The auxiliary content server 110 transmits a response comprising the advertising content information (e.g. the advert manifest) to the media playback device 104.

Once the playback controller 204 has received the advertising content information from the auxiliary content server 110 and the desired media content from the primary content providing server 108, the playback controller 204 has entire control of playback of desired media content and retrieved auxiliary content. Thus at step S706, if the consuming user 102 does not have any current rewards that would allow pre-roll auxiliary content to be skipped for the desired media content, then the process proceeds to step S708, where the playback controller 204 controls playout of pre-roll auxiliary content that has been retrieved from the auxiliary content store(s) 112 using the identifier(s) in the received auxiliary content information prior to playout of the selected media content. After step S708, the process proceeds to step S710.

If the content consuming user 102 does have a current reward that would all pre-roll auxiliary content to be skipped for the desired media content, the media playback device 104 does not retrieve any pre-roll auxiliary content from the auxiliary content store(s) 112 (as no pre-roll auxiliary content was identified in the received auxiliary content information), and playout of the selected media content commences at step S710. For reward types that are not time based but usage based (e.g. no pre-rolls for your next 4 movies), the auxiliary content server 110 is configured to update the user profile service 304 to use up some of the appropriate reward.

Step S712 indicates that playback of the desired content has reach a mid-roll break for auxiliary content or has finished.

At step S714, if the content consuming user 102 does not have any current rewards that would allow mid-roll auxiliary content to be skipped for the desired media content, then the process proceeds to step S716, where the playback controller 204 controls playout of mid-roll auxiliary content that has been retrieved from the auxiliary content store(s) 112 using the identifier(s) in the received auxiliary content information during playout of the selected media content.

If at step S714, the the content consuming user 102 does have a current reward that would allow mid-roll auxiliary content to be skipped for the desired media content, the media playback device 104 does not retrieve any mid-roll auxiliary content from the auxiliary content store(s) 112 (as no pre-roll auxiliary content was identified in the received auxiliary content information), and playout of the desired media content continues at S718 until the end of the desired media content.

As shown in FIG. 7, the loops of step S712, 714, 716 continues through each of the mid-roll breaks of the desired media content until the end of the desired media content.

As will be appreciated the adaption of the auxiliary content associated with desired media content by the auxiliary content information returned by the auxiliary content server 110 to the media playback device 104 in the process 700 enables the content consuming user 102 to consume the desired media content within the limits of the constrained resource.

It will be appreciated that the content consuming user 102 may have a current reward that allows only a portion of auxiliary content associated with a particular location in the desired media content (e.g. pre-roll, mid-roll, post-roll) to be skipped. Thus in this scenario, the auxiliary content information (e.g. the advert manifest) will still include at least one identifier of auxiliary content that is to be retrieved from the auxiliary content store(s) 112 for playout at the location in the desired media content. However it will be apparent that the amount of auxiliary content to be played out to the content consumer 102 will still be reduced which may enable the content consuming user 102 to consume the desired media content within the limits of the constrained resource. Whilst it has been described above that prior to selection of desired media content, the content consuming user 102 may redeem accumulated reward points on one or more rewards. Embodiments of the present invention extend to the redemption of accumulated reward points on a reward after selection of desired media content.

Figure 8:
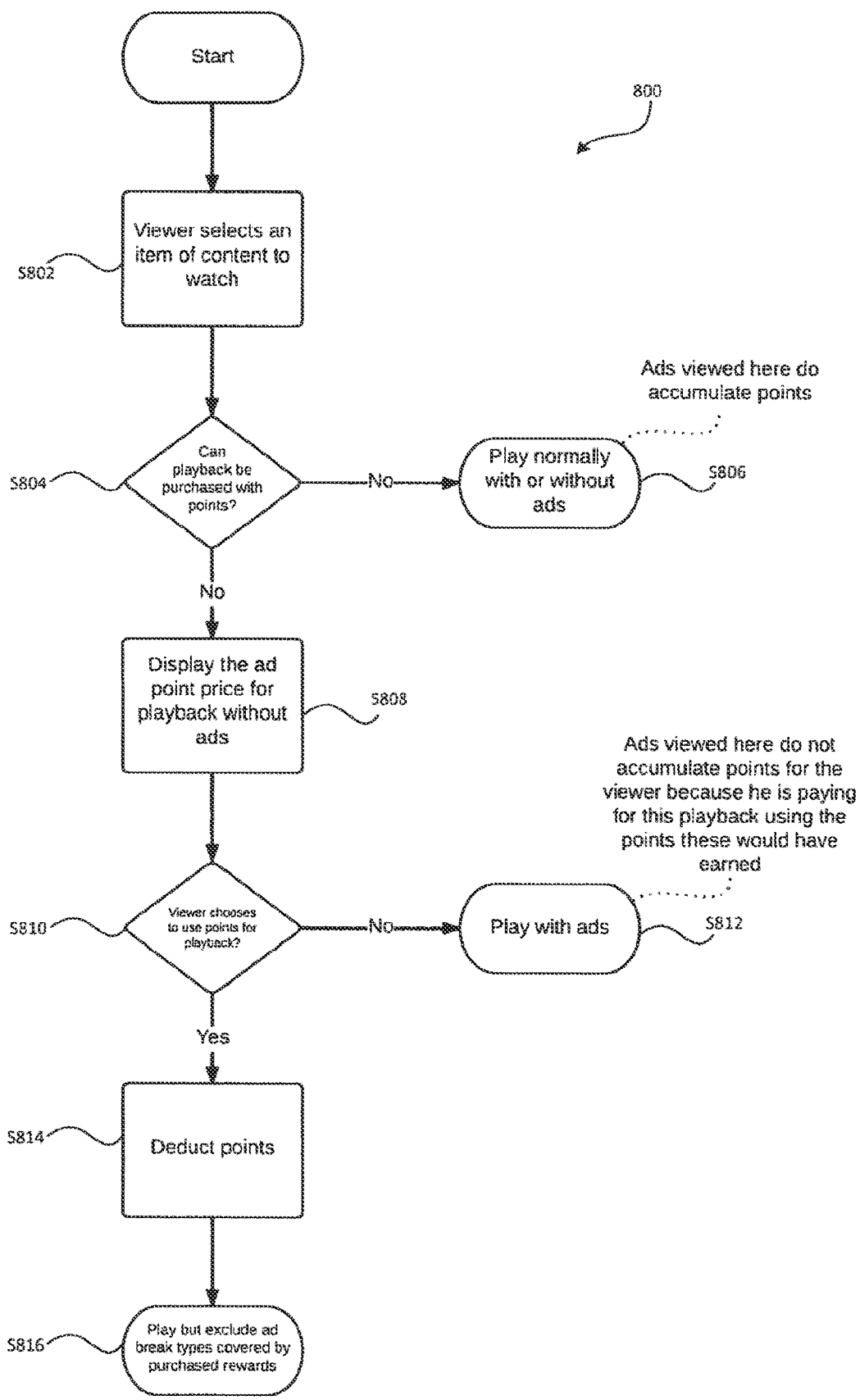
FIG. 8 illustrates a flow chart for a process that enables that the content consuming user to consume desired media content within the limits of a constrained resource.

Reference is now made to FIG. 8 which illustrates a process 800 that enables that the content consuming user 102 to consume desired media content within the limits of the constrained resource.

As described above, the media playback device 104 is arranged to display media content that is available for selection by the content consuming user 102 on the display 105 of the media playback device 104.

The media playback device 104 is arranged to display media content that is available for selection by the content consuming user 102 on the display 105 of the media playback device 104.

At step S802, the content consuming user 102 selects to consume an item of media content.

The selected media content may be available for viewing with both pre-roll and mid-roll auxiliary content.

A list of rewards available for redemption by the content consuming user 102 is communicated from the rewards service 302 to either the media playback device 104 or the companion user device 114 associated with the content consuming user 102 for display to the content consuming user 102.

This rewards list may indicate that the selected media content is also available for viewing in one or more further formats including for example: no pre-roll auxiliary content, no mid-roll auxiliary content, and no pre-roll or mid-roll auxiliary content. Each of these further formats has an associated reward point price.

If playback of the selected media content in one of these further formats is not available, then the selected media content is retrieved (as described above) and output on the media playback device 104 at step S806. Consumption and/or interactions with auxiliary content associated with the selected media content that is output at step S806 allows the content consuming user 102 to accrue rewards points.

If playback of the selected media content in one or more of these further formats is available, then the media playback device 104 is arranged to display the reward points required to view the desired media content in one or more of these further formats at step S808.

If the content consuming user 102 does not select to redeem reward points to consume the desired media content then the process 800 proceeds to step S812 whereby the selected media content is retrieved (as described above) and output on the media playback device 104 (including output of the auxiliary content).

If the content consuming user 102 does select to redeem reward points to consume the desired media content then the process 800 proceeds to step S814 whereby the rewards service 302 communicate this purchase to the reward point accumulator 306. At step S814, The reward point accumulator 306 is configured to deduct the reward point price associated with the media content in the selected further format from the reward point balance associated with the media consumption account of the content consuming user 102.

Following reception of an alert that the content consuming user 102 has selected to redeem reward points, the user profile service 304 is configured to communicate the purchased reward to the auxiliary content providing server 110, illustrated by the "rewards available" data flow shown in FIG. 3a.

Thus, upon receiving a request for auxiliary content information (an advert manifest) from the media playback device 104 that is covered by the redeemed reward, then the auxiliary content server 110 returns auxiliary content information to the media playback device 104 that does not include any information pertaining to auxiliary content (i.e. returns an empty advert manifest). Therefore, at step S816, the selected media content is played out on the media playback device 104 in accordance with the selected further format whereby auxiliary content associated with the auxiliary break type (pre-roll, mid roll) covered by the purchased reward is not output to the content consuming user 102.

As will be appreciated the adaption of the auxiliary content associated with desired media content by the auxiliary content information returned by the auxiliary content server 110 to the media playback device 104 in the process 800 enables the content consuming user 102 to consume the desired media content within the limits of the constrained resource.

Further flexibility is provided in that embodiments of the present invention also extend to the redemption of accumulated reward points on a reward during consumption of auxiliary content associated with desired media content.

Figure 9:
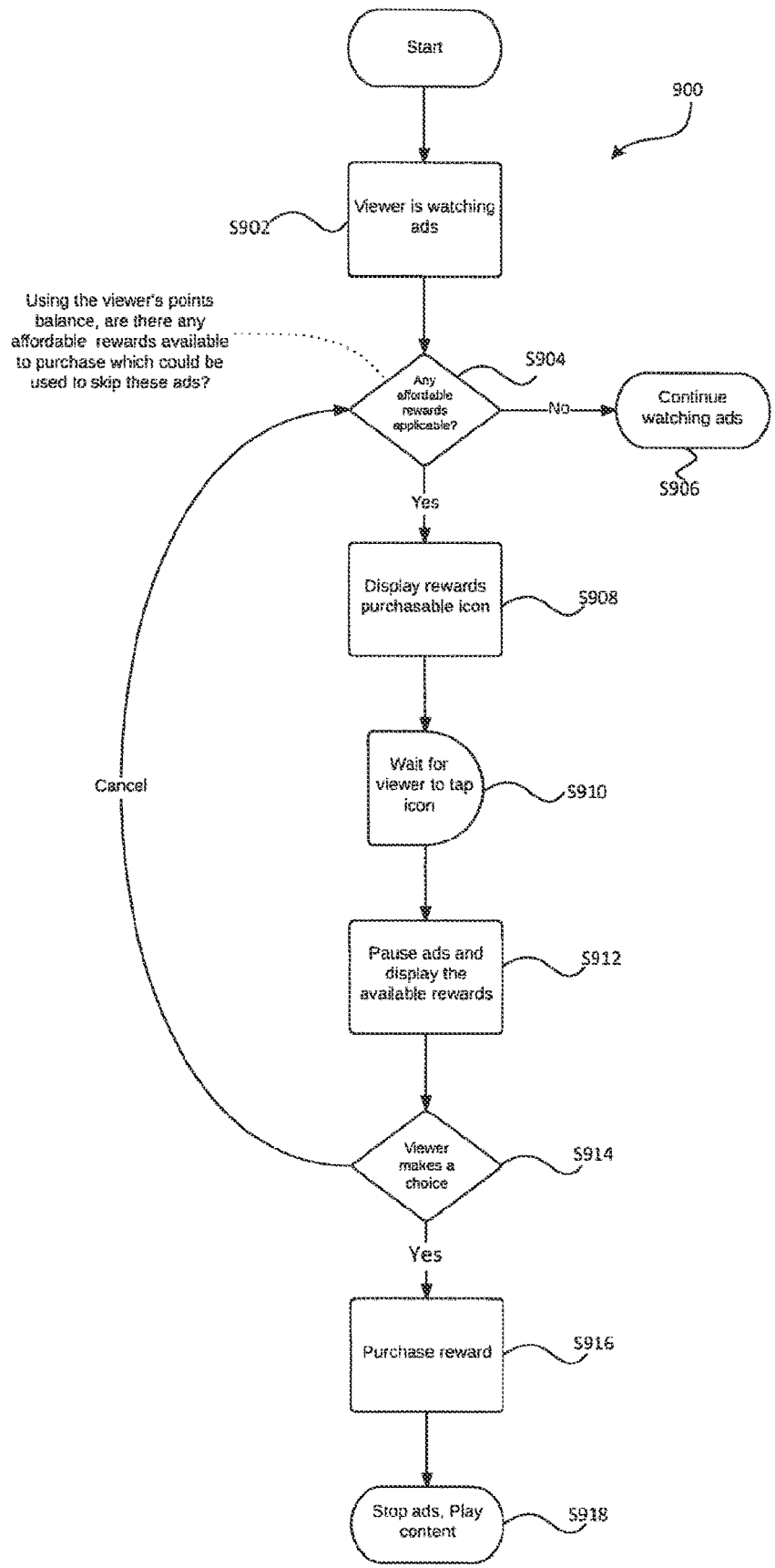
FIG. 9 illustrates a flow chart for a process that enables that the content consuming user to consume desired media content within the limits of a constrained resource.

Reference is now made to FIG. 9 which illustrates a process 900 that enables that the content consuming user 102 to consume desired media content within the limits of the constrained resource.

At step S902, the content consuming user 102 is consuming auxiliary content associated with selected desired media content. The auxiliary content may be pre-roll or mid-roll or auxiliary content. The process of how this auxiliary content is retrieved and output by the media playback device 104 has been described above and is therefore not repeated here.

At step S904, based on receiving the list of rewards (and the reward point value associated with each reward in the list) and the reward point balance associated with the media consumption account of the content consuming user 102, the playout controller 204 is able to determine whether there are any affordable rewards available to purchase which could be used to skip the auxiliary content that the content consuming user 102 is consuming.

If at step S904, the playout controller 204 determines that there are no rewards available to purchase which could be used to skip the auxiliary content the process proceeds to step S906 whereby the auxiliary content referred to above with respect to step S902 is played out at the media playback device 104.

If at step S904, the playout controller 204 determines that there are rewards available to purchase which could be used to skip the auxiliary content the process proceeds to step S908. At step S908, the playout controller 204 displays an icon on the display 105 of the media playback device 104 that indicates that a reward is purchasable.

The content consuming user 102 can select the displayed icon using the user interface 202. At step S910, the playout controller 204 waits until it detects selection of the displayed icon by the content consuming user 102.

In response to this detection, at step S912 the playout controller 204 pauses output of the auxiliary content and displays the rewards that are available to the content consuming user 102 on the display 105 of the media playback device 104.

At step S914, the playout controller 204 monitors whether it has received a selection by the user to redeem one or more of the rewards displayed at step S914.

If the playout controller 204 detects that it has received a selection by the user to redeem one or more of the rewards displayed at step S912, then the process 900 proceeds to step S916 where the selected reward is purchased.

At step S916, the playout controller 204 communicates the purchased reward to the rewards service 302. The rewards service 302 communicates this reward purchase to the user profile service 304 so that this currently valid reward can be indicated to the auxiliary content providing server 110 on request. The rewards service 302 also communicates this purchase to the reward point accumulator 306. This enables the reward point accumulator 306 to communicate the updated reward point balance of the content consuming user 102 to the media playback device 104 by way of the "Points balance" data flow. Thus at step S918, the output of auxiliary content is stopped by the playout controller 204 and the playout controller 204 controls the playback module 208 to playout the selected media content. This enables the content consuming user 102 to consume the desired media content within the limits of the constrained resource.

At step S918, the media playback device 104 transmits a tracking event report to the auxiliary content providing server 110 for each piece of auxiliary content that is retrieved from an auxiliary content store 112 but which was unused stating how and why not. In this way, if the media playback device 104 is able to report on auxiliary content that caused the content consuming user 102 to purchase a reward and at what point within them a reward was purchased.

Referring back to step S914, if the playout controller 204 detects that the content consuming user 102 has selected not to redeem one or more of the rewards displayed at step S912, then the process 900 proceeds back to step S904 which is performed during playout of the next piece of auxiliary content. Whilst the embodiment described with reference to FIG. 9 to alerting (during output of auxiliary content) that the content consuming user 102 has a reward is purchasable to skip output of auxiliary content. In another embodiment no such alert is output to the content consuming user 102.

The list of rewards (and the reward point value associated with each reward in the list) may include the reward point value to skip the output of a single piece of auxiliary content such that the single piece of auxiliary content is not played out to content consuming user 102. Thus based on receiving the reward list and the reward point balance associated with the media consumption account of the content consuming user 102, in response to detecting that the content consuming user 102 has selected to skip a single piece of auxiliary content the playout controller 204 is able to determine whether this request is actionable based on the reward point balance associated with the media consumption account of the content consuming user 102.

If the playout controller 204 determines that the request to skip the auxiliary content is actionable based on the reward point balance associated with the media consumption account of the content consuming user 102, the playout controller 204 controls the playback module 208 to stop playout of the auxiliary content and may either (i) commence playout of further auxiliary content that is retrieved based on the auxiliary content information (e.g. an advert manifest) received from the auxiliary content server 110, or (ii) control the playback module 208 to playout the desired media content (if the skipped piece of auxiliary content was the last piece of auxiliary content to be played out in the break for auxiliary content in the playout of the desired media content), This enables the content consuming user 102 to consume the desired media content within the limits of the constrained resource.

The playout controller 204 communicates the purchased reward (skip single piece of auxiliary content) to the rewards service 302. The rewards service 302 communicates this reward purchase to the user profile service 304 and to the reward point accumulator 306 so that the updated reward point balance of the content consuming user 102 can be communicated to the media playback device 104.

An option to skip a single piece of auxiliary content may be displayed on the display 105 of the media playback device 104 regardless of whether the reward point balance associated with the media consumption account of the content consuming user 102 indicates that the reward to skip the output of a single piece of auxiliary content is affordable for the content consuming user 102 or not. If the reward to skip the output of a single piece of auxiliary content is not affordable for the content consuming user 102, the playout controller 204 may display a message on the display 105 of the media playback device 104 alerting them to this.

As an alternative, an option to skip a single piece of auxiliary content may be displayed on the display 105 of the media playback device 104 only if the reward point balance associated with the media consumption account of the content consuming user 102 indicates that the reward to skip the output of a single piece of auxiliary content is affordable for the content consuming user 102. In a modification to the above described embodiment, in response to detecting that the content consuming user 102 has selected to skip a single piece of auxiliary content and that the request to skip the auxiliary content is actionable based on the reward point balance associated with the media consumption account of the content consuming user 102, the playout controller 204 is configured to transmit a request for auxiliary content information (e.g. an advert manifest) to the auxiliary content server 110 via the network interface 206 over the network 106, and in response, receive auxiliary content information (the advert manifest) from the auxiliary content server 110.

In response to receiving this auxiliary content information from the auxiliary content server 110, the playout controller 204 is configured to display one or more auxiliary content options (referenced in the auxiliary content information from the auxiliary content server 110) that correspond to respective one or more pieces of auxiliary content that the content consuming user 102 may select to consume at a later time (for example when they are next consuming media content not within the limits of a constrained resource). For example a list of advertisements may be displayed on the display 105 of the media playback device 104.

If the content consuming user 102 selects not to defer consumption of auxiliary content the playout controller 204 detects that the content consuming user 102 has selected to skip a single piece of auxiliary content and the playout controller 204 operates in accordance with the above described embodiment, If the content consuming user 102 selects one or more pieces of auxiliary content that the content consuming user 102 agrees to consume at a later time, the playout controller 204 is configured to store auxiliary advertising content information associated with the selected one or more pieces of auxiliary content with an indication of when the selected one or more pieces of auxiliary content is to be played out to the content consuming user 102. This indication may for example indicate that the selected one or more pieces of auxiliary content is to be played the next time a piece of desired media content is selected, or the next time a piece of desired media content is selected after a predetermined period of time has elapsed since the content consuming user 102 selects to consume the one or more pieces of auxiliary content at a later time. Delivery of deferred auxiliary content is illustrated by the "deferred ads" data flow shown in FIG. 3*a*.

The reward point value associated with the deferral of output of auxiliary content may be less than the reward point value associated with skipping of output of auxiliary content (such that the auxiliary content is not played out to content consuming user 102).

By agreeing to consume auxiliary content at a later time, the content consuming user 102 is able to consume the desired media content within the limits of a constrained resource. The list of rewards (and the reward point value associated with each reward in the list) may include the reward point value to defer the output of a single piece of auxiliary content to a later point in time. For example defer the output of auxiliary content to the next time a piece of desired media content is selected for consumption.

Thus based on receiving the reward list and the reward point balance associated with the media consumption account of the content consuming user 102, in response to detecting that the content consuming user 102 has selected to defer the output of a single piece of auxiliary content the playout controller 204 is able to determine whether this request is actionable based on the reward point balance associated with the media consumption account of the content consuming user 102.

If the playout controller 204 determines that the request to defer the output of auxiliary content is actionable based on the reward point balance associated with the media consumption account of the content consuming user 102, the playout controller 204 controls the playback module 208 to stop playout of the single piece of auxiliary content and may either (i) commence playout of further auxiliary content that is retrieved based on the advertising content information (an advert manifest) received from the auxiliary content server 110, or (ii) control the playback module 208 to playout the desired media content (if the skipped piece of auxiliary content was the last piece of auxiliary content to be played out in the break for auxiliary content in the playout of the desired media content). This enables the content consuming user 102 to consume the desired media content within the limits of the constrained resource.

The playout controller 204 is configured to store auxiliary advertising content information associated with the piece of auxiliary content the playout of which the content consuming user 102 has requested to defer with an indication of when the selected piece of auxiliary content is to be played out to the content consuming user 102. This indication may for example indicate that the selected piece of auxiliary content is to be played the next time a piece of desired media content is selected, or the next time a piece of desired media content is selected after a predetermined period of time has elapsed since the content consuming user 102 selects to defer the playout of the piece of auxiliary content to a later time. The list of rewards (and the reward point value associated with each reward in the list) may include the reward point value to defer the output of auxiliary content on the media playback device 104 to another device associated with the content consuming user 102, for example the companion user device 114. The reward list may include a reward point value to defer the output of a single piece of auxiliary content on the media playback device 104 to another device associated with the content consuming user 102. Furthermore, the reward list may include a reward point value to defer the output of all auxiliary content associated with a break for auxiliary content in the playout of the desired media content on the media playback device 104 to another device associated with the content consuming user 102. Furthermore, the reward list may include a reward point value to defer the output of all auxiliary content associated with all breaks for auxiliary content in the playout of the desired media content on the media playback device 104 to another device associated with the content consuming user 102. The reward point value may be based on the amount of auxiliary content that is to be deferred to another device associated with the content consuming user 102.

Thus based on receiving the reward list and the reward point balance associated with the media consumption account of the content consuming user 102, in response to detecting that the content consuming user 102 has selected to defer the output of a auxiliary content to another device associated with the content consuming user 102, the playout controller 204 is able to determine whether this request is actionable based on the reward point balance associated with the media consumption account of the content consuming user 102.

If the playout controller 204 determines that the request to defer the output of auxiliary content is actionable based on the reward point balance associated with the media consumption account of the content consuming user 102, the playout controller 204 transmits a request to the auxiliary content server 110 that auxiliary content information (e.g. an advert manifest) that is covered by the redeemed reward is supplied to the companion user device 114 and in response, the auxiliary content server 110 supplies auxiliary content information (the advert manifest) to the companion user device 114 such that deferred auxiliary content is retrieved by the companion user device 114 from the one or more auxiliary content store 112 and output to the content consuming user 102 using the companion user device 114.

By deferring playout of auxiliary content to the companion user device 114, the desired media content may be played out on the media playback device 114 without interruption. Playout of auxiliary content on the companion user device 114, and playout of desired media content on the media playback device may occur simultaneously. This enables the content consuming user 102 to consume the desired media content within the limits of the constrained resource. Above, embodiments are described in which the auxiliary content providing server 110 detects that the content consuming user 102 has interacted with a piece of auxiliary content using one or more methods that are described herein, and in response to this detection issue reward points to the media consumption account associated with the content consuming user 102.

In response to detecting that the content consuming user 102 has interacted with a piece of auxiliary content using one or more methods that are described herein, as an addition or as an alternative to the reward functionality described above, the auxiliary content providing server 110 may adjust a weighting associated with the piece of auxiliary content to control future delivery of the piece of auxiliary content to the content consuming user 102.

The aim of providers of auxiliary content is typically to provide information to content consumers (e.g. a marketing message including for example the launch of a new product, a sale event, performance tour dates, etc.). It is known for an auxiliary content providing server to report consumption data of auxiliary content to provider of auxiliary content (based on the tracking reports it receives from content consuming devices) so that they can attempt to gauge how likely it was that the information was actually conveyed to content consumers.

Merely being aware that auxiliary content has been played out to a content consuming user 102 is not sufficient to make a determination that information concerning the auxiliary content has been conveyed to the content consuming user 102. For example, upon the media playback device 104 playing out auxiliary content, the content consumer 102 may leave the environment in which the media playback device 104 is located and return to the environment after the auxiliary content has played out.

A known approach to this is for the auxiliary content server to deliver the same piece of auxiliary content multiple times to the content consuming user. For example the same piece of auxiliary content may be (i) output to the user multiple times in the same break for auxiliary content during output of a particular piece desired content, (ii) in a plurality of different breaks for auxiliary content during output of a particular piece of desired content, and/or (iii) output during breaks for auxiliary content when different desired media content is consumed. This known approach is based on the principle that the more times the piece of auxiliary content is output to the content consuming user 102, the more likely it is that that the information concerning the auxiliary content has been conveyed to the content consuming user 102.

The inventors have recognised that this known approach requires a large amount of data to be transmitted over the network 106 before a provider of auxiliary content is satisfied that information concerning the auxiliary content has been conveyed to the content consuming user 102.

Figure 10:
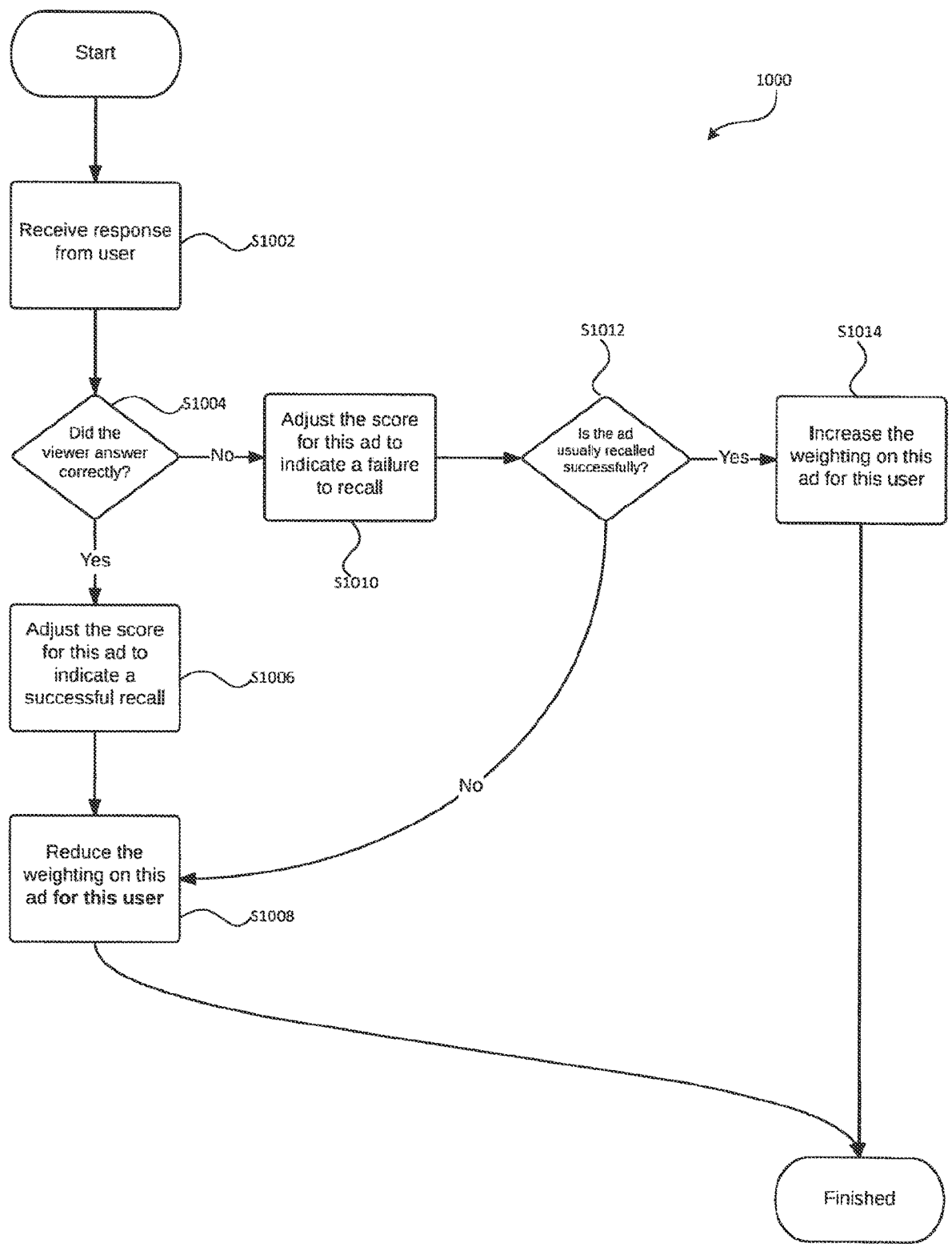
FIG. 10 illustrates a flowchart for a process for adjusting a weighting associated with a piece of auxiliary content to control future delivery of the piece of auxiliary content to the content consuming user.

Reference is now made to FIG. 10 which illustrates a flowchart for a process 1000 for adjusting a weighting associated with a piece of auxiliary content to control future delivery of the piece of auxiliary content to the content consuming user 102.

At step S1002, the auxiliary content providing server 110 receives a user engagement instruction response from the content consuming user 102. This user engagement instruction response may be received over the network from the media playback device 104 or the companion user device 114.

Embodiments in which a user engagement instruction response is transmitted to the auxiliary content providing server 110 in response to the content consuming user 102 interacting with auxiliary content are described above and therefore not repeated here.

At step S1004, the auxiliary content providing server 110 determines whether or not the content consuming user 102 has responded properly by assessing whether an expected user actuation has been executed. For example, when the auxiliary content providing server 110 detects that the content consuming user 102 has interacted with a piece of auxiliary content using the third method described above, step S1004 comprises the auxiliary content providing server 110 determines whether the content consuming user 102 has successfully recalled a brand or logo associated with auxiliary content displayed to them.

If at step S1004, the auxiliary content providing server 110 determines that the content consuming user 102 has responded in accordance with an expected user actuation then the process 1000 proceeds to step S1006.

At step S1006, the auxiliary content providing server 110 adjusts a score for this auxiliary content to indicate a successful user engagement with the auxiliary content (for example that the content consuming user 102 has successfully recalled a brand or logo associated with auxiliary content displayed to them). A score for each piece of auxiliary content referenced in the advertising content information supplied to content consuming users of the content delivery system 100 is maintained by the auxiliary content providing server 110. The adjustment to the score performed at step S1006 may be a simple increment of the score by a predetermined amount however other adjustments may be implemented.

After step S1006 is performed the process 1000 proceeds to step S1008. At step S1008, the auxiliary content providing server 110 reduces a weighting for this particular auxiliary content whereby the weighting is specific to the user. This weighting affects future delivery of the piece of auxiliary content to the content consuming user 102. For each content consuming user of the content delivery system 100, the auxiliary content providing server 110 maintains the weightings for each piece of auxiliary content referenced in the advertising content information that is supplied to content consuming user. The reduction of the weighting on this particular auxiliary content for the content consuming user 102 performed at step S1008 may be a simple decrement of the weighting by a predetermined amount however other reductions may be implemented.

Referring back to step S1004, if at step S1004 the auxiliary content providing server 110 determines that the content consuming user 102 has no responded in accordance with an expected user actuation then the process 1000 proceeds to step S1010.

At step S1010, the auxiliary content providing server 110 adjusts the score for this auxiliary content to indicate an unsuccessful user engagement with the auxiliary content (for example that the content consuming user 102 did not successfully recalled a brand or logo associated with auxiliary content displayed to them). The adjustment to the score performed at step S1006 may be a simple decrement of the score by a predetermined amount however other adjustments may be implemented.

After step S1010 is performed the process 1000 proceeds to step S1012. At step S1012, the auxiliary content providing server 110 determines whether content consumers of the content delivery system 100 usually engage with the auxiliary content in accordance with an expected user actuation (e.g. usually recalled a brand or logo associated with auxiliary content displayed to them). Step S1010 may be performed by the auxiliary content providing server 110 by determining whether the success rate of user engagement with the auxiliary content that is in accordance with an expected user actuation exceeds a predetermined threshold. If at step S1012, the auxiliary content providing server 110 determines that content consumers of the content delivery system 100 do not usually engage with the auxiliary content in accordance with an expected user actuation, the process 1000 proceeds to step S1008 described above.

If at step S1012, the auxiliary content providing server 110 determines that content consumers of the content delivery system 100 do usually engage with the auxiliary content in accordance with an expected user actuation, the process 1000 proceeds to step S1014.

At step S1014, the auxiliary content providing server 110 increases the weighting for this particular auxiliary content whereby the weighting is specific to the user. As described above, this weighting affects future delivery of the piece of auxiliary content to the content consuming user 102. The increase of the weighting on this particular auxiliary content for the content consuming user 102 performed at step S1014 may be a simple increment of the weighting by a predetermined amount however other weighting increases may be implemented.

Thus, the process 1000 advantageously allows the delivery frequency of a piece of auxiliary content to be reduced in response to the auxiliary content providing server 110 determining that the content consuming user 102 has responded in accordance with an expected user actuation. That is, the auxiliary content providing server 110 can reduce the amount of data that is required to be transmitted over the network 106 before a provider of auxiliary content is satisfied that information concerning the auxiliary content has been conveyed to the content consuming user 102. Whilst embodiments have been described above with regards to the redemption of reward points (accrued through user engagement with auxiliary content) to adapt the way auxiliary content is output to the content consumer 102. Embodiments also extend to the redemption of reward points (accrued through user engagement with auxiliary content) to enable functionality with respect to content. In one embodiment, the desired content is an asset with an associated monetary value, which is able to be consumed by the content consumer 102 without transmitting payment for the asset provided that the user properly engages with the user engagement data referred to above.

After user engagement with auxiliary content, a user engagement response is transmitted from the companion user device 114 or the media playback device 104 to the auxiliary content providing server 110.

The auxiliary content providing server 110 detects whether or not the content consuming user 102 has responded properly by assessing whether an expected user actuation has been executed i.e. if the response was adequate—perhaps the user failed to respond effectively by inputting nonsense or misleading data.

If the response was adequate the auxiliary content providing server 110 is configured to transmit content release indication to the playback controller 204 on the media playback device 104. In response to receiving this content release indication, the playback controller 204 controls the playback module to commence output of the desired media content to the display 105. Prior to playout of the desired media content a message may be shown on the display 105 indicating that the selected content will now be shown.

If the response was deemed not adequate, or if the user does not engage at all, the auxiliary content providing server 110 does not transmit a content release indication to the playback controller 204 on the media playback device 104 and the desired content does not play.

The content consuming user 102 may be presented with the option to cancel/abandon the request to view the content. Alternatively, he could be presented with a bypass option to bypass the user engagement elements and purchase the content by exchanging payment. If he engages with the user engagement elements, he will receive the desired content without exchanging payment. In an alternative option, he could receive the desired content at a discounted price.

That is, in order to unlock desired content a content consuming user 102 needs to complete an activity. In one example described above the activity which the content consuming user 102 needs to complete is a question and answer session in response to some auxiliary content, whereby the unlocked content can be a TV show, movie or something similar. This activity can replace a payment mechanism. That is, formerly an end user might pay by card, paypal etc. for a show; they might purchase a subscription to a channel or a set of channels; they might subscribe to a particular standard of programming. By engaging with auxiliary content such that a user engagement response is transmitted to the auxiliary content providing server 110, a content consuming user 102 can gain access to desired content without providing any payment while content providers gain insights into their audience from the data collected about what brands and products they like.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A computer implemented method for detecting engagement by a user with auxiliary content consumed by the user at a playback device, the method comprising the steps, at a server of a content delivery system, of:

receiving a request for auxiliary content associated with media content selected by the user for viewing at the playback device;

providing a piece of auxiliary content to the playback device;

receiving a user engagement response from the playback device in response to the user interacting with the piece of auxiliary content;

determining if the user has interacted properly with the piece of auxiliary content, by assessing whether an expected user actuation has been executed;

reducing a user-specific weighting of for the piece of auxiliary content, if it is determined that the user has responded in accordance with an expected user actuation, wherein the user-specific weighting affects future delivery of the piece of auxiliary content to the content consuming user, the method further comprising:

determining whether content delivery system users usually engage with the auxiliary content in accordance with the expected user actuation, by determining whether the success rate of user engagement with the auxiliary content for content delivery system users is in accordance with an expected user actuation exceeding a predetermined threshold, wherein the step of increasing the user-specific weighting of the piece of auxiliary content is dependent on a determination that users do usually engage with the auxiliary content in accordance with the expected user actuation.

2. The method of claim 1, wherein if it is determined that content delivery system users do not usually engage with the auxiliary content in accordance with the expected user actuation, reducing the user-specific weighting of the piece of auxiliary content.

3. A server of a content delivery system configured to detect engagement by a user with auxiliary content consumed by the user at a playback device, the server being further configured to:
receive a request for auxiliary content associated with media content selected by the user for viewing at the playback device;
provide a piece of auxiliary content to the playback device;
receive a user engagement response from the playback device in response to the user interacting with the piece of auxiliary content;
determine if the user has interacted properly with the piece of auxiliary content, by assessing whether an expected user actuation has been executed; and
reduce a user-specific weighting of for the piece of auxiliary content, if it is determined that the user has responded in accordance with an expected user actuation,
wherein the weighting affects future delivery of the piece of auxiliary content to the content consuming user,
the server further configured to:
determine that content delivery system users do not usually engage with the auxiliary content in accordance with the expected user actuation; and
reduce the user-specific weighting of the piece of auxiliary content.

4. A computer implemented method for detecting engagement by a user with auxiliary content consumed by the user at a playback device, the method comprising the steps, at a server of a content delivery system, of:
receiving a request for auxiliary content associated with media content selected by the user for viewing at the playback device;
providing a piece of auxiliary content to the playback device;
receiving a user engagement response from the playback device in response to the user interacting with the piece of auxiliary content;
determining if the user has interacted properly with the piece of auxiliary content, by assessing whether an expected user actuation has been executed; and
reducing a user-specific weighting of for the piece of auxiliary content, if it is determined that the user has responded in accordance with an expected user actuation, wherein the weighting affects future delivery of the piece of auxiliary content to the content consuming user, wherein the delivery frequency of a piece of auxiliary content is thereby reduced in response to determination that the content consuming user has responded in accordance with an expected user actuation, such that the amount of data that is required to be delivered over the network is reduced for a provider of auxiliary content to be satisfied that the information concerning the auxiliary content has been conveyed to the user.

5. The method of claim 4, wherein the step of reducing the user-specific weighting decrements the weighting by a predetermined amount.

6. The method of claim 4, further comprising:
increasing the user-specific weighting for the piece of auxiliary content, if it is determined that the user has not responded in accordance with the expected user actuation.

7. The method of claim 6, wherein the step of increasing the user-specific weighting increments the weighting by a predetermined amount.

8. The method of claim 6 further comprising determining whether content delivery system users usually engage with the auxiliary content in accordance with the expected user actuation, by determining whether the success rate of user engagement with the auxiliary content for content delivery system users is in accordance with an expected user actuation exceeding a predetermined threshold, wherein the step of increasing the user-specific weighting of the piece of auxiliary content is dependent on a determination that users do usually engage with the auxiliary content in accordance with the expected user actuation.

9. The method of claim 4, further comprising:
determining if the user has responded in accordance with an expected user actuation; and
adjusting a score for the piece of auxiliary content in dependence thereon.

10. The method of claim 9, wherein if it is determined that the user has responded in accordance with an expected user actuation, the score for the piece of auxiliary content is adjusted to indicate a successful user engagement with the auxiliary content.

11. The method of claim 9, wherein if it is determined that the user has not responded in accordance with an expected user actuation, the score for the piece of auxiliary content is adjusted to indicate an unsuccessful user engagement with the auxiliary content.

12. The method of claim 9, wherein there are provided a plurality of pieces of auxiliary content, each piece of auxiliary content being associated with a score.

13. The method of claim 4, wherein the step of providing further comprises providing a plurality of pieces of auxiliary content, and the step of determining further comprises determining if the user has interacted properly with each piece of auxiliary content.

14. The method of claim 4, wherein there is a provided a plurality of pieces of auxiliary content, each piece of auxiliary content being associated with a plurality of weightings, each weighting being for one of a plurality of users.

15. A non-transitory computer program product for storing computer program code which, when implemented on a computer, performs the method of claim 4.

16. A server of a content delivery system configured to detect engagement by a user with auxiliary content consumed by the user at a playback device, the server being further configured to:
receive a request for auxiliary content associated with media content selected by the user for viewing at the playback device;
provide a piece of auxiliary content to the playback device;
receive a user engagement response from the playback device in response to the user interacting with the piece of auxiliary content;
determine if the user has interacted properly with the piece of auxiliary content, by assessing whether an expected user actuation has been executed; and
reduce a user-specific weighting of for the piece of auxiliary content, if it is determined that the user has responded in accordance with an expected user actuation, wherein the weighting affects future delivery of the piece of auxiliary content to the content consuming user, wherein the server is further configured to:

reduce the delivery frequency of a piece of auxiliary content in response to determination that the content consuming user has responded in accordance with an expected user actuation, such that the amount of data that is required to be delivered over the network is reduced for a provider of auxiliary content to be satisfied that the information concerning the auxiliary content has been conveyed to the user.

17. The server of claim 16, further configured to:

increase the user-specific weighting for the piece of auxiliary content if it is determined that the user has not responded in accordance with the expected user actuation.

18. The server of claim 17, further configured to:

determine whether the content delivery system users usually engage with the auxiliary content in accordance with the expected user actuation, by determining whether the success rate of user engagement with the auxiliary content for content delivery system users is in accordance with an expected user actuation exceeding a predetermined threshold; and increase the user-specific weighting of the piece of auxiliary content dependent on a determination that users do usually engage with the auxiliary content in accordance with the expected user actuation.

19. The server of claim 16, further configured to:

provide a plurality of pieces of auxiliary content; and determine if the user has interacted properly with each piece of auxiliary content.

20. The server according to claim 16 further configured to determine that content delivery system users do not usually engage with the auxiliary content in accordance with the expected user actuation, and reduce the user-specific weighting of the piece of auxiliary content.

* * * * *